(12) United States Patent
Hector, Jr. et al.

(10) Patent No.: US 8,622,409 B2
(45) Date of Patent: Jan. 7, 2014

(54) STRUCTURE, COMPONENTS AND METHOD FOR CONSTRUCTING AND OPERATING AN AUTOMATICALLY SELF LOCKING MANUALLY PROPELLED VEHICLE SUCH AS A WHEEL CHAIR

(76) Inventors: Melvin G. Hector, Jr., Tucson, AZ (US); Dana R. Yentzer, Tucson, AZ (US)

( * ) Notice: Subject to any disclaimer, the term of this patent is extended or adjusted under 35 U.S.C. 154(b) by 426 days.

(21) Appl. No.: 12/716,875

(22) Filed: Mar. 3, 2010

(65) Prior Publication Data
US 2010/0225086 A1 Sep. 9, 2010

Related U.S. Application Data

(60) Provisional application No. 61/157,152, filed on Mar. 3, 2009.

(51) Int. Cl.
*B62M 1/14* (2006.01)
*A61G 5/02* (2006.01)
*F16D 65/14* (2006.01)

(52) U.S. Cl.
USPC .................. 280/250.1; 188/109; 188/2 F

(58) Field of Classification Search
USPC ........... 280/250.1, 304.1; 188/250.1, 2 F, 109
See application file for complete search history.

(56) References Cited

U.S. PATENT DOCUMENTS

| | | | |
|---|---|---|---|
| 2,259,924 A | 10/1941 | Connolly | |
| 2,426,451 A | 8/1947 | Hammack | |
| 2,753,919 A | 7/1956 | Sill | |
| 2,896,693 A | 7/1959 | Schladebach | |
| 3,216,752 A | 11/1965 | Rifken | |
| 3,302,757 A | 2/1967 | Eagleson | |
| 3,302,759 A | 2/1967 | Nydam | |
| 3,423,113 A | 1/1969 | Gonsalves | |
| 3,529,700 A | 9/1970 | Marshall | |
| 3,618,968 A | 11/1971 | Greer | |
| 3,790,212 A | 2/1974 | Suyetani | |
| 3,897,857 A | 8/1975 | Rodaway | |
| 3,903,513 A | 9/1975 | Green | |
| 4,026,568 A | 5/1977 | Hallam | |
| 4,039,263 A | 8/1977 | Bassler | |
| 4,045,051 A | 8/1977 | Igarashi | |
| 4,083,598 A | 4/1978 | Thomas | |
| 4,084,663 A | 4/1978 | Haley | |
| 4,140,341 A | 2/1979 | Rabe | |
| 4,204,588 A | 5/1980 | Kawecki | |
| 4,245,847 A | 1/1981 | Knott | |
| 4,294,561 A | 10/1981 | Chapman | |
| 4,320,818 A | 3/1982 | Knoche | |
| 4,326,732 A | 4/1982 | Gall | |
| 4,347,840 A | 9/1982 | Adams | |
| 4,350,227 A * | 9/1982 | Knoche ..................... 188/2 F |

(Continued)

*Primary Examiner* — Kevin Hurley

(57) ABSTRACT

Several new and useful concepts for a manually propelled vehicle such as a wheel chair are provided. In one concept, the vehicle is configured to be selectively placed in an automatic lock condition in which (i) the wheel chair can move in a conventional manner while an occupant is seated in the wheel chair, and (ii) the wheel chair is automatically locked against movement when an occupant begins to rise from a seated position on the wheel chair. In another concept, a particularly secure structure is provided for locking the wheel of the wheel chair against movement. In yet another concept, important components of the wheel chair are formed in a manner that facilitates assembly of those components into the wheel chair, by an internal fastening system and in a modular fashion.

7 Claims, 21 Drawing Sheets

(56) References Cited

U.S. PATENT DOCUMENTS

| | | |
|---|---|---|
| 4,384,732 A | 5/1983 | Wierwille |
| 4,476,964 A | 10/1984 | Broman |
| 4,500,102 A | 2/1985 | Haury |
| 4,514,243 A | 4/1985 | Moore |
| 4,515,385 A | 5/1985 | Christian |
| 4,515,497 A | 5/1985 | Gillemot |
| 4,538,825 A | 9/1985 | Delahoussaye |
| 4,538,826 A | 9/1985 | Lemarie |
| 4,560,033 A | 12/1985 | DeWoody |
| 4,560,181 A | 12/1985 | Herron |
| 4,565,385 A | 1/1986 | Morford |
| 4,570,756 A | 2/1986 | Minnebraker |
| 4,575,113 A | 3/1986 | Boudreau |
| 4,597,140 A | 7/1986 | Girard |
| 4,597,690 A | 7/1986 | Girard |
| 4,623,043 A | 11/1986 | Babilas |
| 4,639,012 A | 1/1987 | Jensen |
| 4,679,509 A | 7/1987 | Sampson |
| 4,679,816 A | 7/1987 | Riikonen |
| 4,682,783 A | 7/1987 | Kuschall |
| 4,691,933 A | 9/1987 | Strauss |
| 4,702,638 A | 10/1987 | Zalesak |
| 4,721,321 A | 1/1988 | Haury |
| 4,768,797 A | 9/1988 | Friedrich |
| 4,784,511 A | 11/1988 | Greene |
| 4,805,925 A | 2/1989 | Haury |
| 4,805,931 A | 2/1989 | Slasor |
| 4,811,964 A | 3/1989 | Horn |
| 4,825,971 A | 5/1989 | Bernstein |
| 4,840,390 A | 6/1989 | Lockard |
| 4,852,697 A | 8/1989 | Kulik |
| 4,877,260 A | 10/1989 | Howland |
| 4,887,830 A | 12/1989 | Fought |
| 4,961,473 A | 10/1990 | Jones |
| 4,962,941 A | 10/1990 | Rembos |
| 4,966,379 A | 10/1990 | Mulholland |
| 4,981,305 A | 1/1991 | Lockard |
| 5,011,175 A | 4/1991 | Nicholson |
| 5,020,816 A | 6/1991 | Mulholland |
| 5,029,674 A | 7/1991 | Boyes |
| 5,037,120 A | 8/1991 | Parisi |
| 5,039,165 A | 8/1991 | Rothman |
| 5,137,295 A | 8/1992 | Peek |
| 5,141,250 A | 8/1992 | Morgan |
| 5,145,197 A | 9/1992 | Gatti |
| 5,160,156 A | 11/1992 | Mendon |
| 5,188,383 A | 2/1993 | Thompson |
| 5,197,750 A | 3/1993 | DiGeorge |
| 5,201,377 A | 4/1993 | Wilson |
| 5,203,433 A * | 4/1993 | Dugas ........................ 188/2 F |
| 5,217,239 A | 6/1993 | Koet |
| 5,232,236 A | 8/1993 | Korpi |
| 5,244,223 A | 9/1993 | Uchiyama |
| 5,253,888 A | 10/1993 | Friedrich |
| 5,261,470 A | 11/1993 | Genaw |
| 5,294,141 A | 3/1994 | Mentessi |
| 5,307,910 A | 5/1994 | Im |
| 5,319,818 A | 6/1994 | Baranowski |
| 5,358,266 A | 10/1994 | Roth |
| 5,360,224 A | 11/1994 | Geiger |
| 5,366,277 A | 11/1994 | Tremblay |
| 5,379,866 A | 1/1995 | Pearce |
| 5,401,044 A | 3/1995 | Galumbeck |
| 5,401,076 A | 3/1995 | Dunlap |
| 5,421,598 A | 6/1995 | Robertson |
| 5,452,775 A | 9/1995 | Bussinger |
| 5,480,179 A | 1/1996 | Peacock |
| 5,490,687 A | 2/1996 | Scholl |
| 5,513,867 A | 5/1996 | Bloswick |
| 5,555,224 A | 9/1996 | DePonty |
| 5,577,748 A | 11/1996 | Dombrowski |
| 5,593,173 A | 1/1997 | Williamson |
| 5,743,544 A | 4/1998 | Weaver |
| 5,743,545 A | 4/1998 | Kunze |
| 5,785,384 A | 7/1998 | Sagstuen |
| 5,799,756 A | 9/1998 | Roberts |
| 5,857,688 A | 1/1999 | Swearingen |
| 5,884,928 A | 3/1999 | Papac |
| 5,894,912 A * | 4/1999 | Dobben ........................ 188/2 F |
| 5,927,739 A | 7/1999 | Evling |
| 5,984,334 A * | 11/1999 | Dugas ........................ 280/250.1 |
| 5,984,418 A | 11/1999 | McInturff |
| 5,988,304 A | 11/1999 | Behrendts |
| 6,012,555 A | 1/2000 | Duran |
| 6,086,086 A | 7/2000 | Hanson |
| 6,092,824 A | 7/2000 | Ritchie |
| 6,126,187 A | 10/2000 | Vassilli |
| 6,139,037 A | 10/2000 | Papac |
| 6,189,906 B1 | 2/2001 | Horacek |
| 6,217,050 B1 | 4/2001 | Dickie |
| 6,264,007 B1 | 7/2001 | Norton |
| 6,270,105 B1 | 8/2001 | Friedrich |
| 6,279,936 B1 | 8/2001 | Ritchie |
| 6,302,429 B1 | 10/2001 | Friedrich |
| 6,315,085 B1 | 11/2001 | Dahlem |
| 6,315,306 B1 | 11/2001 | Fernie |
| 6,331,036 B1 | 12/2001 | Papac |
| 6,341,671 B1 | 1/2002 | Ebersole |
| 6,347,688 B1 | 2/2002 | Hall |
| 6,352,138 B1 | 3/2002 | Duran |
| 6,371,502 B1 | 4/2002 | Howlett |
| 6,371,503 B2 * | 4/2002 | Ritchie et al. ............ 280/304.1 |
| 6,390,426 B1 | 5/2002 | Berry |
| 6,406,095 B1 | 6/2002 | Bouchard |
| 6,431,572 B1 | 8/2002 | Harden |
| 6,467,785 B2 | 10/2002 | Toppses |
| 6,474,743 B1 | 11/2002 | Harker |
| 6,520,526 B2 | 2/2003 | Amirola |
| 6,607,250 B2 | 8/2003 | Papac |
| 6,634,660 B2 | 10/2003 | Miller |
| 6,655,503 B1 | 12/2003 | Moody |
| 6,684,969 B1 | 2/2004 | Flowers |
| 6,715,780 B2 | 4/2004 | Schaeffer |
| 6,722,692 B2 | 4/2004 | Fukaya |
| 6,739,610 B2 * | 5/2004 | Connors et al. ............ 280/304.1 |
| 6,769,705 B1 | 8/2004 | Schlangen |
| 6,854,754 B1 | 2/2005 | Easley |
| 6,880,845 B1 | 4/2005 | Broyles |
| 6,886,843 B1 | 5/2005 | Papac |
| 6,916,032 B2 | 7/2005 | Wong |
| 6,994,134 B2 | 2/2006 | Grah |
| 7,021,640 B2 | 4/2006 | Knopf |
| 7,066,482 B2 | 6/2006 | Ford |
| 7,066,549 B2 | 6/2006 | Dennon |
| 7,090,240 B2 | 8/2006 | Papac |
| 7,144,025 B2 | 12/2006 | Wakita |
| 7,204,503 B2 | 4/2007 | Goding |
| 7,243,938 B2 | 7/2007 | Stamps |
| 7,320,473 B1 | 1/2008 | Bennett |
| 7,334,840 B2 | 2/2008 | Deans |
| 7,364,228 B2 | 4/2008 | Entz |
| 7,380,642 B2 | 6/2008 | Miiler |
| 7,520,518 B2 * | 4/2009 | Peterson et al. ........... 280/250.1 |
| 2001/0040354 A1 * | 11/2001 | Ritchie et al. ............ 280/304.1 |
| 2003/0098568 A1 | 5/2003 | Keppler |
| 2003/0146056 A1 * | 8/2003 | Wren ........................ 188/2 F |
| 2003/0226719 A1 * | 12/2003 | Yeager ........................ 188/4 R |
| 2004/0104081 A1 * | 6/2004 | Peron et al. ................ 188/19 |
| 2005/0248122 A1 * | 11/2005 | Ford ........................ 280/304.1 |
| 2006/0011421 A1 * | 1/2006 | Connors et al. ............ 188/5 |

\* cited by examiner

CHAIR FREE TO BE MOBILE WHILE OCCUPIED

CHAIR IN AUTO-LOCK UPON DEPARTURE OF OCCUPANT

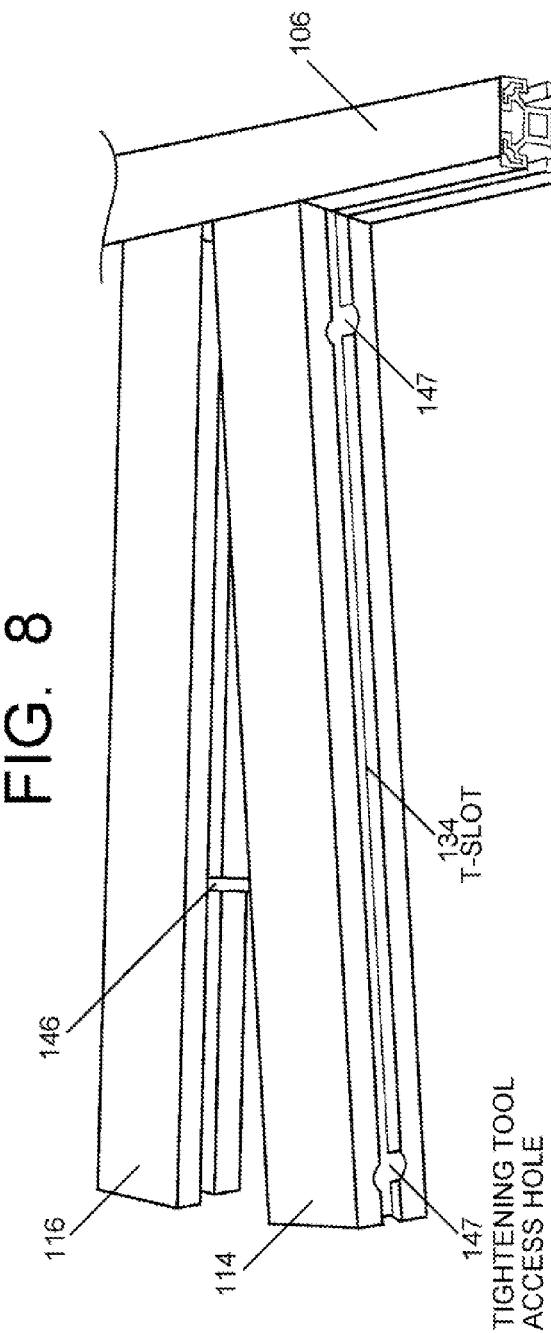
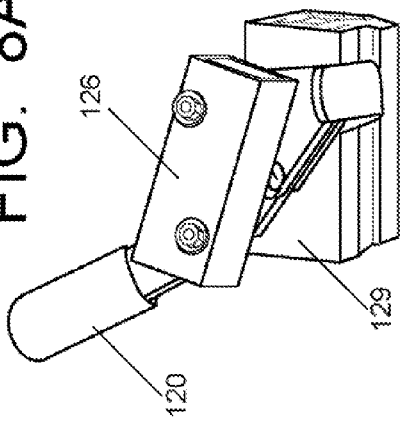
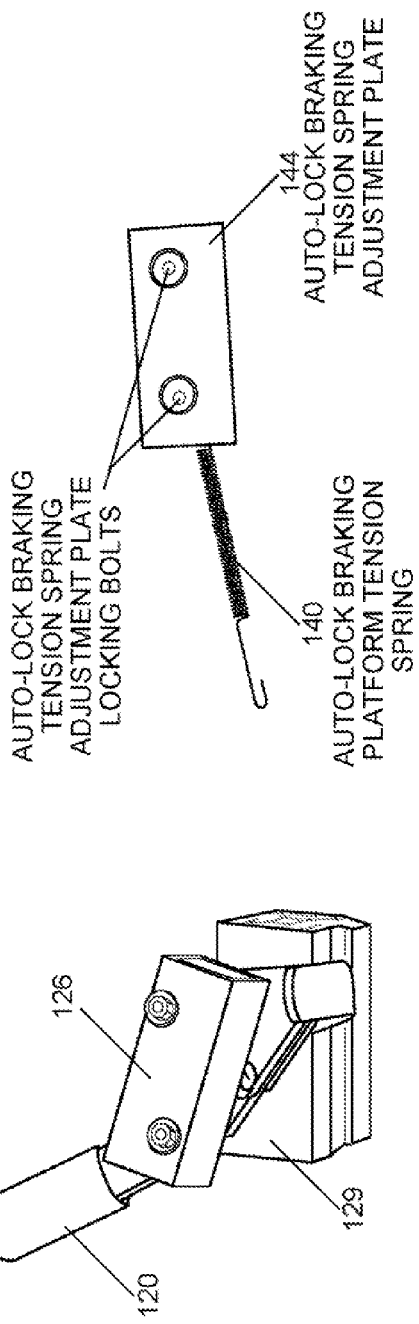

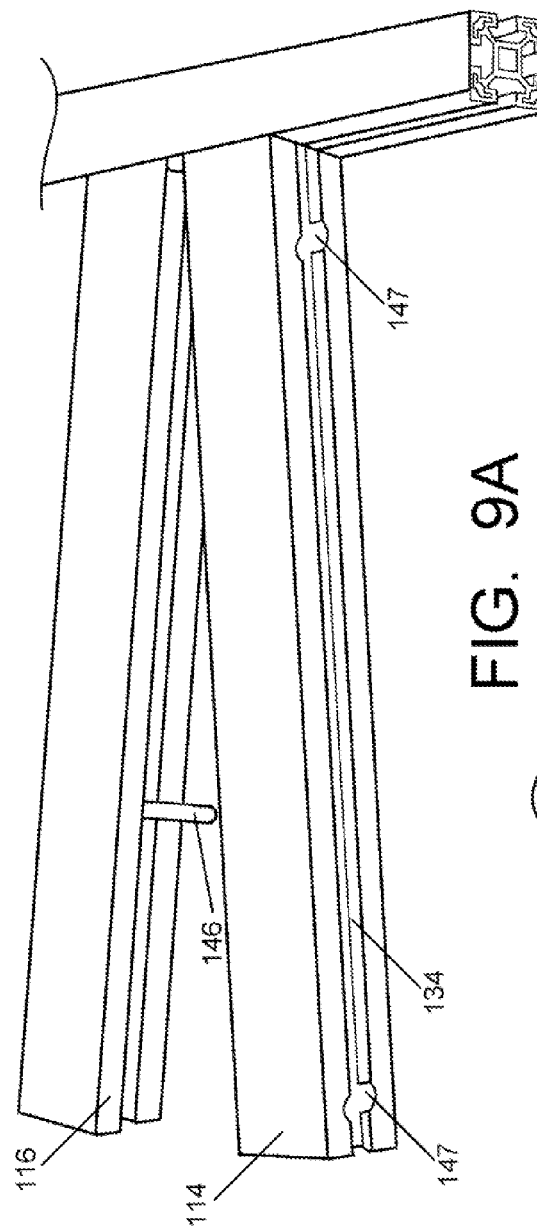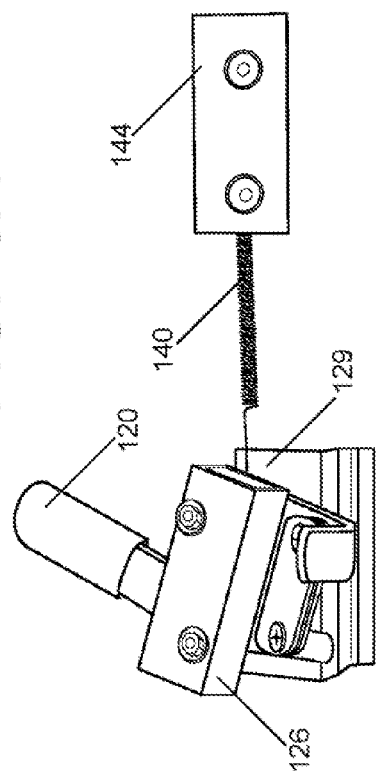

AUTO-LOCK BRAKING TENSION SPRING
ADJUSTMENT PLATE INCLUDING
LOCKING BOLTS AND MACHINED NUTS

119
T-SLOT
LOCKING
MACHINED
NUTS

AUTO LOCK TENSION SPRING

TENSION SPRING
LOCKING PIN
145A

145 T-SLOT LOCKING
MACHINED NUTS

145B
TENSION
SPRING
ORIFICE

AUTO-LOCK BRAKING TENSION SPRING ASSEMBLY

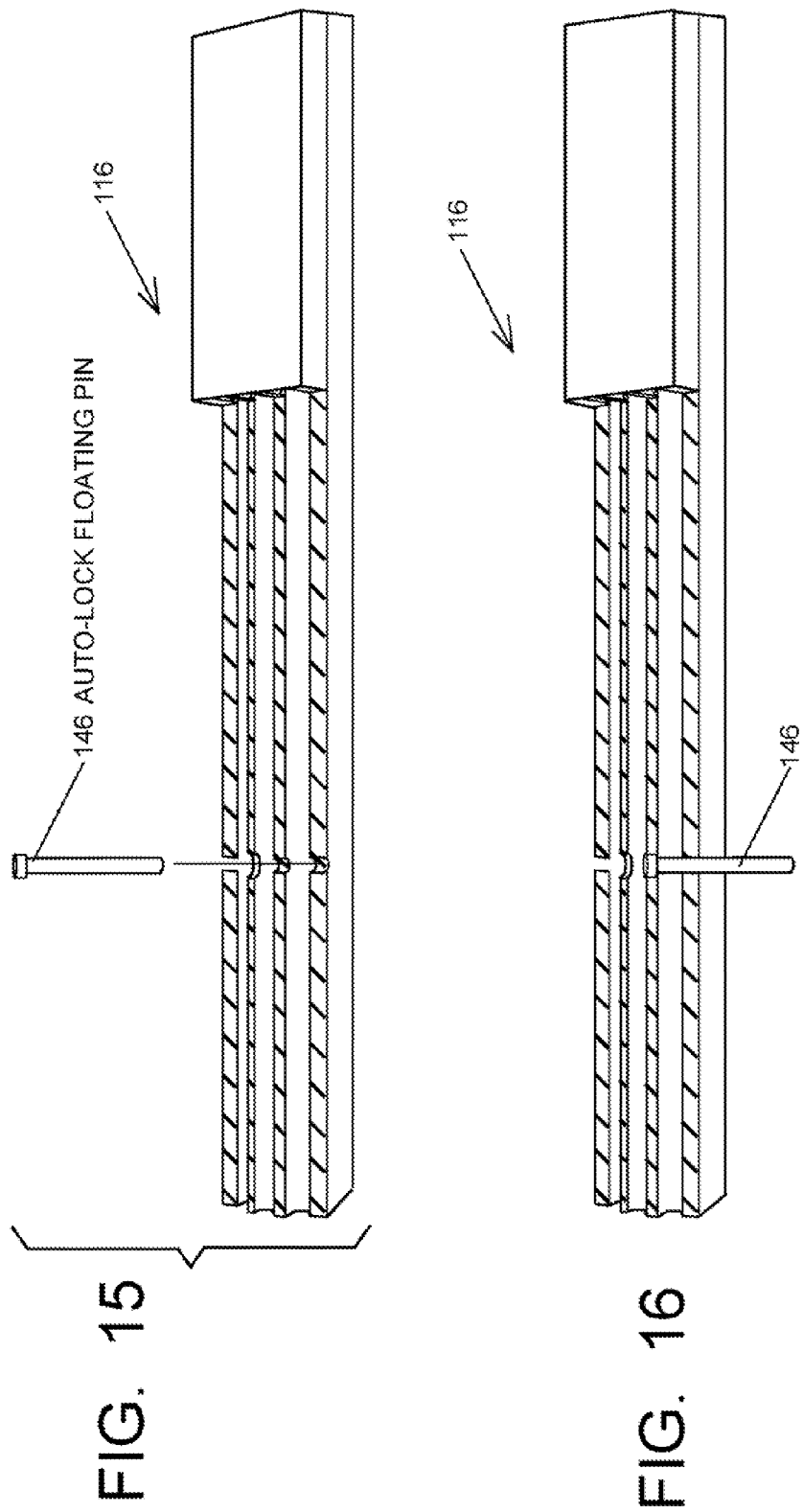

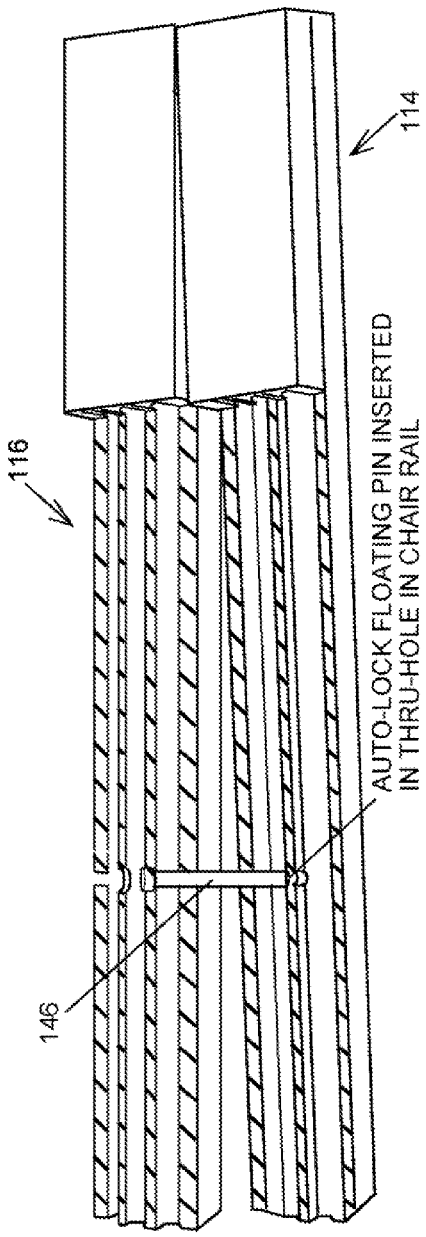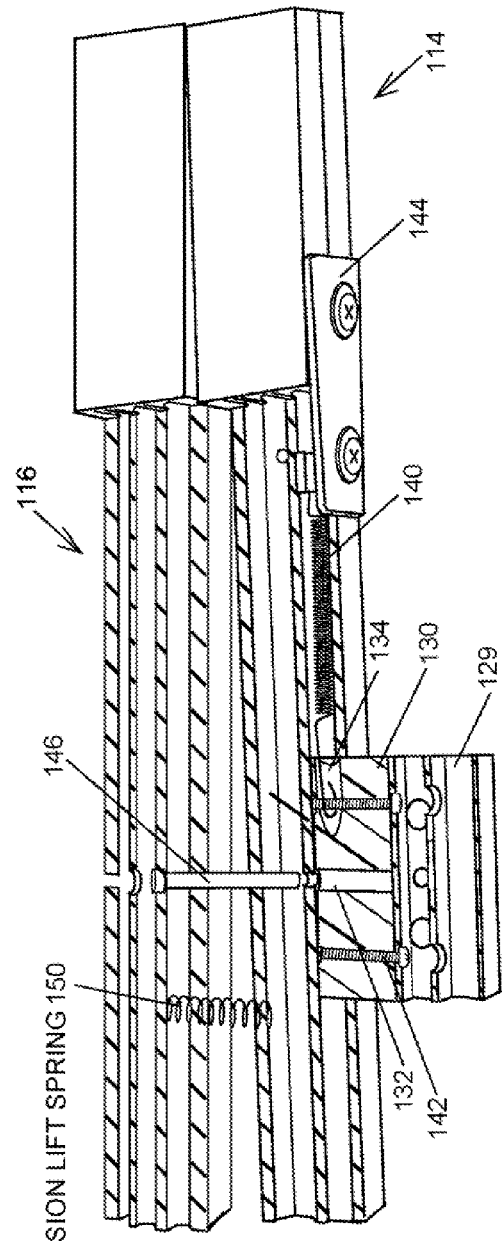

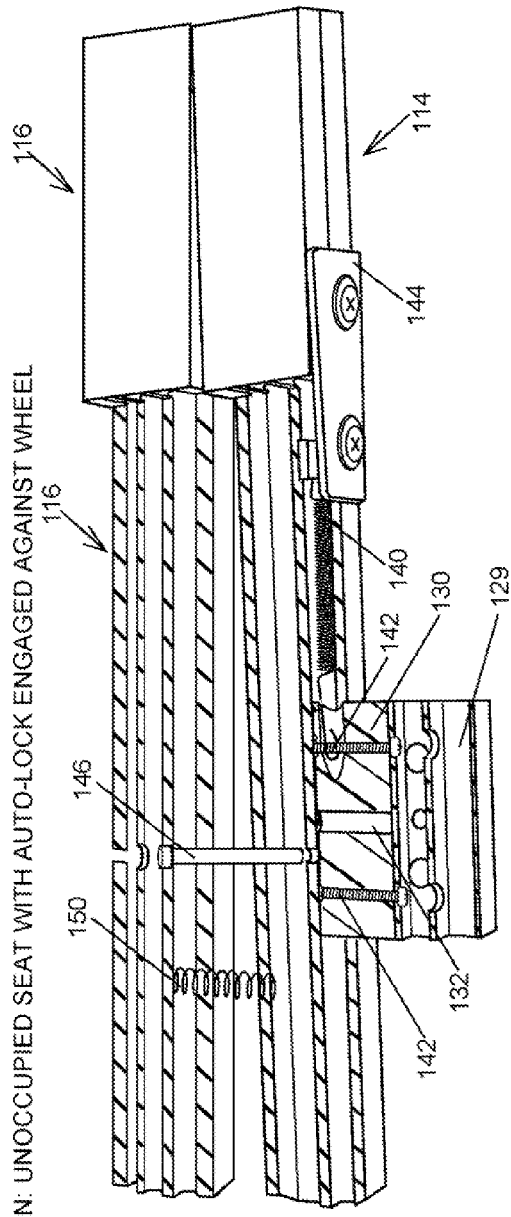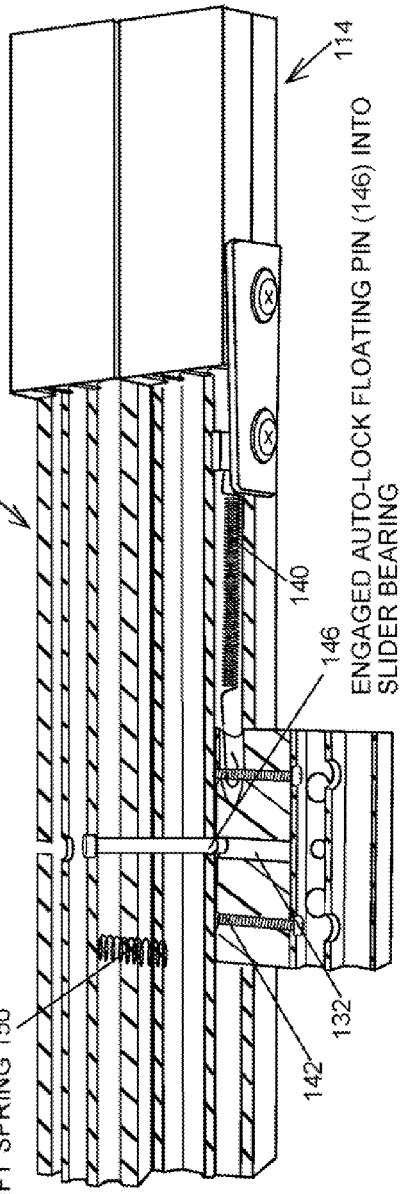

AUTO-LOCK RE-ENGAGED UPON OCCUPANT EXIT

UNOCCUPIED SEAT WITH LOCKING LATCH MECHANISM ENGAGED IN PREPARATION FOR FOLDING

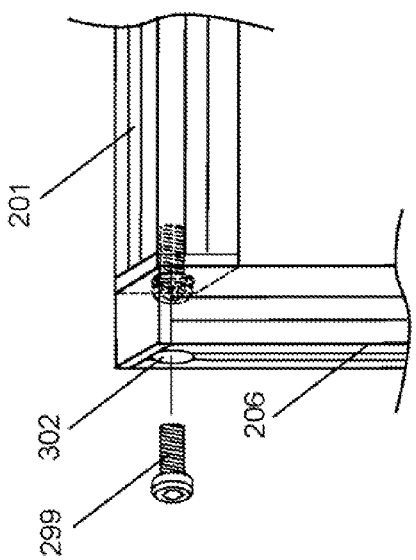
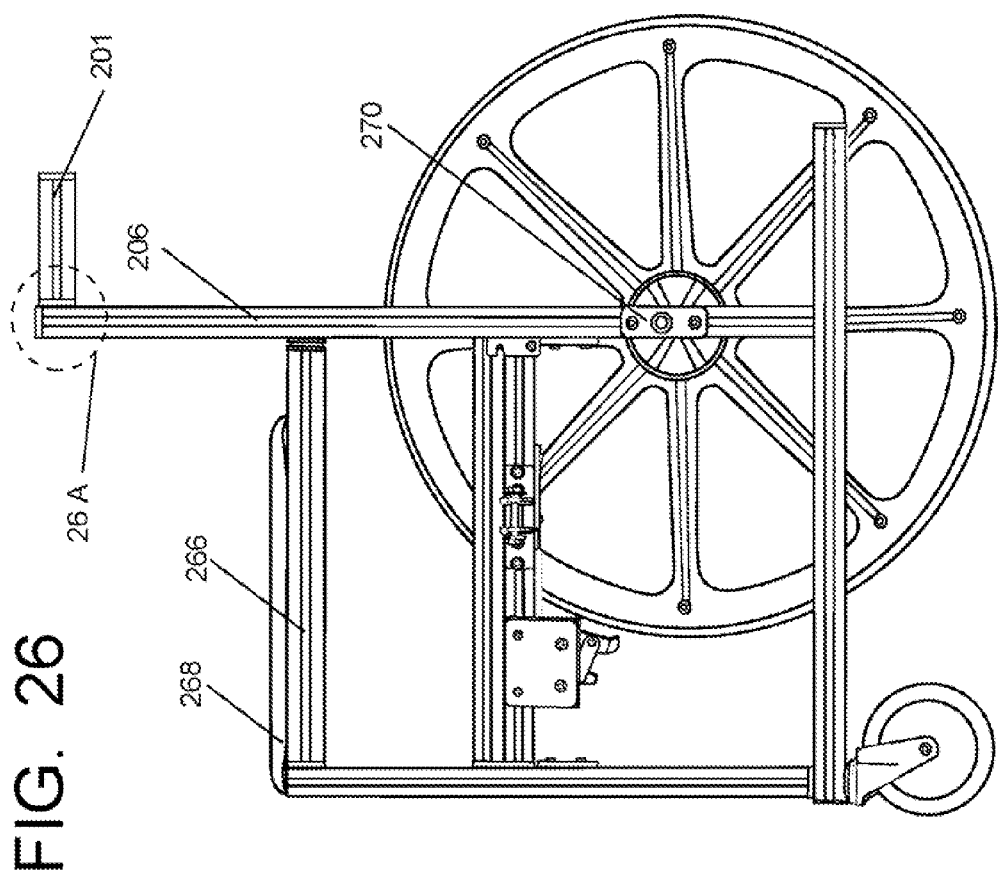

STRUCTURE, COMPONENTS AND METHOD FOR CONSTRUCTING AND OPERATING AN AUTOMATICALLY SELF LOCKING MANUALLY PROPELLED VEHICLE SUCH AS A WHEEL CHAIR

RELATED APPLICATION/CLAIM OF PRIORITY

This application is related to and claims priority from provisional application Ser. No. 61/157,152, filed Mar. 3, 2009, which provisional application is incorporated by reference herein.

BACKGROUND

The present invention relates to new and useful structures, components and methods for constructing and operating a manually propelled vehicle such as a wheel chair, including (a) structures, components and methods for automatically locking the wheels of the vehicle when the occupant starts to get out of the vehicle, (b) locking components for locking the wheel of the vehicle against movement, and (c) components of the vehicle that are designed to facilitate assembly of those components into the vehicle.

Wheel chairs used to transport persons that are mobility-impaired have been available for over a century. The first wheel chairs were bulky, heavy and difficult to maneuver. In 1932 the first tubular formed frame wheel chair that was lighter and easier to maneuver was introduced by Harry Jennings. Of necessity, it used folding mechanisms consisting of moveable joints and linkages, etc. to connect the side frames of the chair.

In the applicants' experience, there are currently two commonly used wheel chair designs—the cross brace folding wheel chair and the welded rigid frame wheel chair. Today's disabled population demands lighter, more durable, maneuverable, transportable and utilitarian wheel chairs. Towards that end, in the 1970s a conceptually new wheel chair with a rigid frame was introduced. The wheel chair's side frames are secured to each other by rigid elements (tubes, bars, etc.) by means of welding, which provide a rigid wheel chair without a folding mechanism; such welded rigid frame design may be more expensive due to higher manufacturing costs. However, the absence of a folding mechanism provides the following advantages:

increased strength and durability (fewer moving parts)
increased energy efficiency (folding mechanism absorbed energy needed to propel the chair)
decreased weight (fewer parts)
increased maneuverability
increased stability
increased comfort.

Examples of wheel chairs that utilize welded joints are disclosed in U.S. Pat. Nos. 4,840390 and 4,981,305 issued to Lockard et al. A sports wheel chair is disclosed in U.S. Pat. No. 4,500,102 issued to Haury et al that includes a one piece, welded tubular frame assembly. Another U.S. Pat. No. 4,721,321 issued to Haury discloses a similar sports wheel chair construction. Another welded wheel chair frame is disclosed in U.S. Pat. No. 4,811,964 issued to Horn for a wheel chair propelled by rowing.

There are also wheel chairs that are modular in design and can change widths of the wheel chair with little difficulty. For example, there is a design that converts from a user-propelled wheel chair to an assistant-propelled wheel chair (see e.g. U.S. Pat. No. 5,294,141). There is also a wheel chair that converts the riding position from the standard seating position to a recumbent position (see e.g. U.S. Pat. No. 5,011,175). In addition, there is a weld-free folding wheel chair that folds in a non-conventional manner but is not modular (U.S. Pat. No. 4,682,783). Another wheel chair design appears to be a weld-free design that allows the wheel chair to adjust to different needs by use of special shaped bars and plates but in the applicants' view is limited to width and depth adjustment (U.S. Pat. No. 5,743,545).

Also, there are several U.S. patents that claim to be modular, allowing for different components to be used to build the chair to the user's needs. Among these is a rigid frame wheel chair (U.S. Pat. No. 5,421,598), but applicants believe this wheel chair does not convert or adapt to the extent of the current invention. A folding frame wheel chair that is moveable between and upper normal sitting position and a lower reclining position that does not utilize welds is disclosed in U.S. Pat. No. 5,011,175 issued to Nicholson, et al. However, such a chair is a folding frame wheel chair. While it includes no welds, it is secured together by means of pivoted members or linkages that render the chair construction less stable and less secure. In applicants' view, the chair has all of the disadvantages of the folding frame wheel chairs.

Also known are numerous clamping element designs for securing two or more tubular members to each other. By way of example only, reference is made to U.S. Pat. No. 4,515,497 issued to Guillemot et. al. for a clamping element for releasable fastening of spatially arranged, or parallel bars, tubes, and similar objects; U.S. Pat. No. 4,039,263 issued to Bassler for a connector arrangement for a minimum of three struts along the spatial axes; U.S. Pat. No. 4,294,561 to Chapman et al for a jointing member for frame systems; U.S. Pat. Nos. 4,597,140 and 4,597,690 issued to Girard for tube clamps; U.S. Pat. No. 3,423,113 issued to Gonsalves et. al. for a connection for tubular members; U.S. Pat. No. 4,784,511 issued to Greene for a connector for tubular frame members; and U.S. Pat. No. 3,216,752 issued to Rifken for coupling means for building frameworks, racks, scaffolds, and the like. In U.S. Pat. No. 4,702,638 issued to Zalesak, inexpensive, molded plastic shells for corners and elbows is disclosed. In U.S. Pat. No. 5,253,888 Friedrich discloses a tubular rigid wheel chair system secured by mating semi-cylindrical shells that can be readily disassembled for transport or repair, but not readily foldable for daily use. In this invention, a series of specially designed clamps had to be utilized that were not universal, and bolts were clearly visible, detracting from the appearance of the wheel chair. In U.S. Pat. No. 6,270,105 Friedrich discloses a wheel chair system that is constructed with distortion-free connectors and that can be configured or adapted to a multitude of end user configurations, still using the tubular construction typical for wheel chairs of this era. Schlangen in U.S. Pat. No. 6,769,705 discloses a rigid non-foldable wheel chair with a system of longitudinal beams to which tubes are attached so that the seat, frame and footrests are releasably connected with supports without welding members, held together instead with expansion devices. In U.S. Pat. No. 6,126,187 Vassilli discloses a modular wheel chair construction of low cost tubes assembled with exposed rivets and screws constructed without welding.

Notwithstanding the fact that numerous clamps have been proposed for securing tubular members to each other, in applicants' experience the wheel chair industry has continued to rely on welded frame construction for rigid wheel chairs. However, the welding/brazing operations have proven to be inconsistent, hazardous, time consuming and expensive. It results in metal fatigue due to crystallization/oxidation, creates a heat-effected zone next to the weld which could lead to a potential safety hazard (i.e., collapse of the chair). It also requires additional operations such as polishing/grinding, electrochemical plating, etc., all of which are hazardous to both workers and to the environment.

All of the above processes would have to be repeated in the case of an accidental failure of the chair (i.e., weld breakage), which would entail a high repair cost. Breakage of welded or brazed joints is the major cause of structural failures in welded wheel chairs.

Almost all manually propelled wheeled vehicles such as wheel chairs have manual wheel locks that prevent the vehicle from rolling when an occupant either attempts to sit in or rise from said vehicle. Because the physically or mentally frail state of many occupants often prevents them from engaging such locks, thereby increasing their risk for injurious falls, many such vehicles also utilize an anti-rollback apparatus. Anti-rollback apparati prevent unintended rearward chair motion when the occupant is attempting to exit or enter said vehicle. Prior constructs to create a self-locking anti-rollback system for self-propelled vehicles such as wheel chairs have suffered from a variety of disadvantages. Some such as U.S. Pat. No. 2,426,451 disclosed by Hammack, and U.S. Pat. No. 4,350,227 by Knoche, rely on pressure on the armrest to lock the chair, which does not take into account when an occupant might get off of the seat by pulling on something like their bed rather than pushing on the armrest. Some disclosures such as U.S. Pat. No. 6,315,085 by Dahlem and U.S. Pat. No. 6,431,572 by Harden require pushing a seat lever out of the occupant's way that engages the brake before they can exit the chair, creating an obstacle for the confused patient. Some disclosures such as Marshall's U.S. Pat. No. 3,529,700, and Kuilk's U.S. Pat. No. 4,852,697 only allow the assistant from behind to lock or unlock the device. Many examples exist of prior attempts to engage the large diameter driving wheel hub as the locking region, requiring intricate and expensive construction or adaptations of existing vehicles such as U.S. Pat. No. 3,897,857 disclosed by Rodaway, U.S. Pat. No. 4,538,825 by Lemarie, U.S. Pat. No. 5,203,433 by Dugas, U.S. Pat. No. 5,799,756 by Roberts, U.S. Pat. No. 6,012,555 by Duran, and U.S. Pat. No. 6,264,007 by Norton. Others require volitional (non-automatic) locking of the hub brake as in U.S. Pat. No. 5,379,866 by Pearce, U.S. Pat. No. 5,984,334 by Dugas, and U.S. Pat. No. 6,341,671 as disclosed by Ebersole. Some automatic locking devices require levers under the seat that are potentially uncomfortable or prone to cause pressure sores as in U.S. Pat. No. 5,894,912 by Dugas, U.S. Pat No. 6,092,824 by Ritchie, and U.S. Pat. No. 7,066,482 by Ford. Other patent disclosures will not allow the wheel chair to collapse and fold when added onto the wheel chair as in U.S. Pat. No. 6,092,824 by Ritchie. Still others focus their attention to the large diameter driving wheel rim or tire itself, but are too complex as is U.S. Pat. No. 4,623,043 by Babilas, or are just for caregiver operation as add-ons to the vehicle as in U.S. Pat. No. 4,852,697 by Kulik. Others such as U.S. Pat. No. 6,352,138 by Duran, or U.S. Pat. No. 6,739,610 by Connors work by leveraging arms into the ground surface when the patient gets up. What is needed is an efficient, simple, reliable, unobtrusive, inexpensive self-locking anti-rollback system for self-propelled vehicles such as wheel chairs that will prevent an incapacitated occupant from experiencing rollaway of their vehicle when exiting or entering same.

SUMMARY OF THE INVENTION

The present invention provides new and useful structure, components and method concepts for a manually propelled vehicle such as a wheel chair, designed in light of the foregoing background. Specifically, the present invention relates to new and useful structures, components and methods for constructing and operating a manually propelled vehicle such as a wheel chair, including (a) structures, components and methods for automatically locking the wheels of the vehicle when the occupant starts to get out of the vehicle, (b) locking components for locking the wheel of the vehicle against movement, and (c) components of the vehicle that are designed to facilitate assembly of those components into the vehicle.

In one of its aspects, the present invention provides a new and useful paradigm for automatically locking a vehicle such as a wheel chair against movement whenever an occupant starts to get out of the wheel chair. More particularly, the present invention provides an automatic braking assembly and anti-rollback feature for a manually propelled vehicle such as a wheel chair, that is designed to protect an occupant who has not manually braked the wheel chair before attempting to get out of the wheel chair. The automatic braking assembly is designed automatically to brake the wheels of the wheel chair when an occupant starts to rise from a seated position on the wheel chair. Once the wheels are braked, the automatic braking assembly will not allow the wheels to roll until the automatic braking assembly is intentionally disengaged. Thus, the automatic braking assembly will prevent the wheel chair from sliding away from the occupant as the occupant dismounts from or remounts the wheel chair, and will not allow motion or rollback of the wheel chair until the braking system is volitionally released. Therefore, the automatic braking assembly should help minimize risk of injuries to occupants of wheel chairs. The automatic braking assembly may be readily disengaged for use by those occupants or attendants who may have no need for it, in which case the wheel chair will functions exactly like any other wheel chair with a conventional, manually actuated braking system, i.e., it rolls until it is volitionally locked.

Thus, according to this aspect of the present invention, a manually propelled vehicle such as a wheel chair is configured to be selectively placed in an automatic lock condition in which (i) the vehicle can move in a conventional manner while an occupant is seated in the vehicle, and (ii) the vehicle is automatically locked against movement when an occupant begins to rise from a seated position on the vehicle.

The vehicle preferably has an automatic braking assembly that has a cocked position in which an auto lock brake device is disengaged from the wheel of the vehicle, and is automatically moved to a locked condition in which it locks the vehicle against movement when an occupant begins to rise from a seated position on the vehicle. The vehicle includes a seat rail disposed over a chair rail, the seat rail resting on the chair rail when an occupant is seated in the vehicle and the automatic braking assembly is in the cocked position. The seat and chair rails are assembled with each other and with the frame of the vehicle so that they will automatically separate in a predetermined manner when an occupant begins to rise from a seated position. When the seat and chair rails separate in that predetermined manner, the automatic braking device is actuated automatically, and the auto lock brake device is automatically moved to the locked condition, in which it locks a wheel of the vehicle against movement. The automatic braking assembly preferably includes a lock tensioning structure in which a tension spring that is being held in tension is released and causes the auto lock brake device to lock the wheel of the vehicle against movement when an occupant begins to rise from the vehicle, and the automatic braking assembly is configured to tension the spring and hold the tension spring in tension while the seat rail is resting on the chair rail and the automatic braking assembly is in a cocked position; in such a manner that tension in the tension spring is released when the occupant begins to rise from the vehicle and the seat rail is automatically pivoted relative to the chair rail.

In another aspect of the present invention, the chair rail and the seat rail are each formed of relatively rigid members that can be (a) connected to each other with mechanical fasteners, in a way that enables them to move relative to each other in a predetermined manner, and (b) assembled with the wheel chair frame in a manner that enables them to move relative to each other in the predetermined manner, while being supported and guided by the wheel chair frame. The relatively rigid members that form the chair rail and the seat rail preferably comprise extruded T-slotted aluminum members. This aspect of the present invention addresses the types of issues discussed above with respect to welded wheel chair frames, and also provides structural concepts that can be used to retrofit existing wheel chairs with the type of automatic braking assembly described herein.

Yet another aspect of the present invention provides a new form of auto lock brake device for a manually propelled vehicle such as a wheel chair. The auto lock brake device has multi edge brake surfaces (e.g. 2 brake surfaces in the preferred embodiment) that are integral parts of the auto lock brake device, and are brought into contact with a wheel of the vehicle to lock the wheel against movement. The multi edge brake surfaces are configured to substantially simultaneously contact portions of the vehicle wheel that are spaced apart about the periphery of the wheel, so that all of the multi edge brake surfaces provide locking force against the wheel. Thus, unlike conventional wheel chairs, that use a single brake blade as a braking mechanism, the present invention is designed to provide a more secure braking structure that is less likely to lose its braking power from repeated use than a locking mechanism that is a single brake blade.

In addition, the present invention provides a new and useful internal fastening system, by which frame components of a vehicle such as a wheel chair can be connected with each other, by means of one or more mechanical fasteners that are located substantially inside the frame components.

Accordingly, it is an object of the invention to provide an improved automatic braking assembly for manually propelled vehicles such as wheel chairs that enables a vehicle to remain stationary until it is unlocked for travel, and is automatically locked when an occupant starts to rise from a seated position on the vehicle.

Moreover, it is another object of the present invention to provide a new and useful concept for locking the wheel of a manually propelled vehicle such as a wheel chair.

It is yet another object of the invention to provide a vehicle such as a wheel chair with important structural features (e.g. a modular frame formed of frame components that are secured together by a new internal fastening system; a chair and seal rail assembly, which forms part of the automatic braking assembly that can be conveniently assembled with the vehicle frame in a manner that enables the chair and seat rails to move relative to each other in a predetermined manner while being supported and guided by the vehicle frame.

Other features of the present invention will become further apparent from the following detailed description and the accompanying drawings.

BRIEF DESCRIPTION OF THE DRAWINGS

FIGS. 2-3, 3A and 3B are fragmentary, schematic illustrations of parts of an automatic braking assembly for a manually propelled vehicle such as a wheel chair, according to the principles of the present invention;

FIGS. 8, 8A, 8B, 9 and 9A are schematic views of parts of an automatic braking assembly for a manually propelled vehicle such as a wheel chair, according to the principles of the present invention;

FIG. 15 is a schematic, partially exploded and partially cut away illustration of a seat rail with anti-lock floating pin parts, for use with an automatic braking assembly for a manually propelled vehicle such as a wheel chair, according to the principles of the present invention;

FIG. 16 is a schematic, partially cut away illustration of a seat rail with auto lock floating pin and retainer installed, for use with an automatic braking assembly for a manually propelled vehicle such as a wheel chair, according to the principles of the present invention;

FIG. 17 is a schematic, partially cut away illustration of a seat rail aligned with a chair rail, with some portions broken away, and showing details of an auto lock floating pin assembly, for use with an automatic braking assembly for a manually propelled vehicle such as a wheel chair, according to the principles of the present invention;

FIG. 18 is a schematic illustration similar to FIG. 17, with a cut away of the auto brake platform with attached slider bearing installed on the chair rail, and also showing the tension spring assembly, for use with an automatic braking assembly for a manually propelled vehicle such as a wheel chair, according to the principles of the present invention;

FIG. 19 is a schematic, partially cut away illustration of a portion of an automatic braking assembly for a manually propelled vehicle such as a wheel chair, according to the principles of the present invention, showing the auto lock brake device in an engaged position while the wheel chair is in a stationary position and unoccupied;

FIG. 20 is a schematic, partially cut away illustration of a portion of an automatic braking assembly for a manually propelled vehicle such as a wheel chair, according to the principles of the present invention, with the auto lock brake device in a locked position when the wheel chair is occupied and free to be rolling and/or operated;

FIG. 26 is a side view of the wheel chair of FIG. 22A, taken from the inside of the wheel chair (the side adjacent the wheel chair occupant); and FIG. 26A is an enlarged, partially exploded view of the portion 26A of FIG. 26, detailing an example of the internal fastening system by which frame components are connected together, in a wheel chair according to the principles of the present invention.

DETAILED DESCRIPTION

As discussed above, the present invention provides new and useful structure and method concepts for a manually propelled vehicle such as a wheel chair. The principles of the present invention are described below in connection with a wheel chair, and from that description, the manner in which the principles of the present invention can be applied to various similar types of manually propelled vehicles will be apparent to those in the art.

Figure 1:
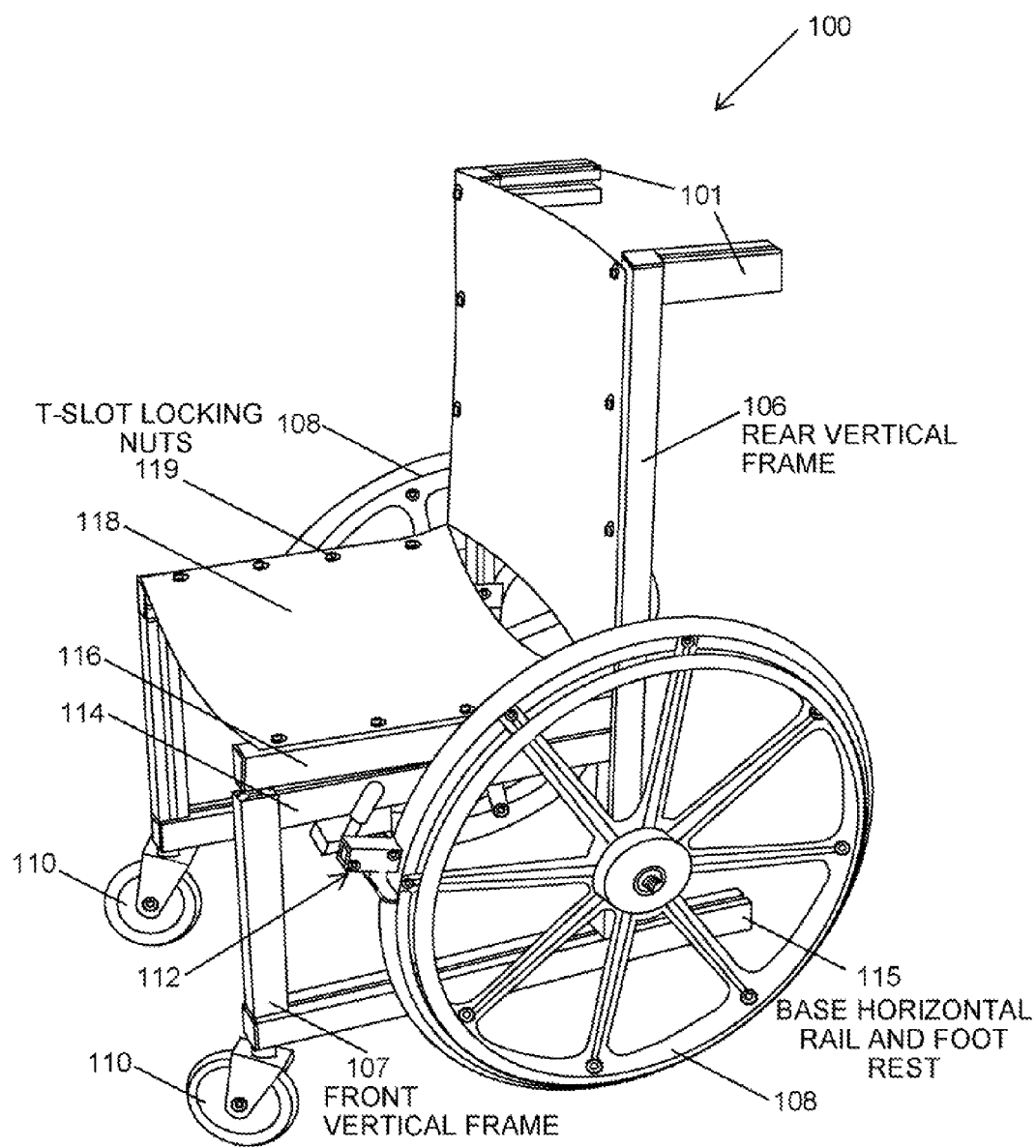
FIG. 1 is a schematic, perspective illustration of one version of a manually propelled vehicle such as a wheel chair, with an automatic braking assembly that is configured according to the principles of the present invention.

FIG. 1 schematically illustrates one version of a wheel chair 100 configured according to the principles of the present invention. The wheel chair 100 comprises a wheel chair with a seat 118, and a wheel chair rear vertical frame 106 that provides a back structure for the wheel chair. A pair of large rear wheels 108 are supported on the wheel chair rear vertical frame 106, in an orientation such that they can be conveniently manually manipulated by a wheel chair occupant. A pair of front wheels 110, of conventional design, are supported at the bottom of a pair of front vertical frames 107 and base horizontal rail and foot rests 115, at the front of the wheel chair. The front vertical frames 107 and the base horizontal rail and foot rests 115 are preferably T-slotted aluminum members. The wheel chair 100 illustrated in FIG. 1 is different from a traditional wheel chair for a medical patient, in that the wheel chair does not include armrests. However, the wheel chair 100 can function as an aisle chair of the type used to transport a person with physical impediment(s) along the aisle of an aircraft.

In accordance with one aspect of the present invention, the wheel chair 100 has a new and useful automatic braking assembly 112 on each side of the wheel chair, that is associated with a respective one of the rear wheels 108. In addition, the wheel chair has a chair rail 114 and a seat rail 116 on each side of the seat 118. The seat rails 116 support the seat 118 for the vehicle occupant, by means of T-slotted locking nuts 119 (also shown in FIGS. 10-12) that attach the seat 118 to the seat rails 116. The seat rails 116 are disposed over the chair rails 114. The automatic braking assembly 112 on each side of the wheel chair is integrated with (i.e. assembled with) the chair rail 114, and the seat rail 116 on that side of the wheel chair, in the manner described in more detail below. When an occupant is seated in the wheel chair, and the wheel chair is being propelled along a surface, weight of the occupant causes the seat rails 116 to normally rest directly on the chair rails 114. In that condition, the automatic braking assemblies 112 can each be in a cocked or disengaged condition, and the wheel chair can be manually manipulated like a conventional wheel chair. However, when an occupant starts to rise from the seat 118, the seat and chair rails 116, 114 automatically separate, in a manner described further herein, and an auto lock device 126, forming part of each automatic braking assembly 112 automatically engages and locks a respective one of the rear wheels 108 against movement, so that the occupant can get out of the wheel chair without injury. As schematically illustrated in FIG. 1, when an occupant starts to rise from the seat 118, the seat and chair rails are biased automatically to separate, preferably by pivoting of the seat rail 116 relative to the chair rail 114, to automatically initiate operation of each automatic braking assembly 112 to lock the wheels 108 against movement. FIG. 1 schematically illustrates the front of one seat rail 116 pivoted to about ⅛ inch above the chair rail 114 (about a fulcrum at the rear of the seat and chair rails), and as the seat rail pivots, the automatic braking assembly 112 forces a respective auto lock brake device 126 against a respective rear wheel 108, to automatically locks the rear wheel 108 against movement, thereby enabling the occupant to exit the wheel chair without risk of rollback or any other movement of the wheel(s) 108 that could affect the occupant's exit from the wheel chair.

Figure 2:
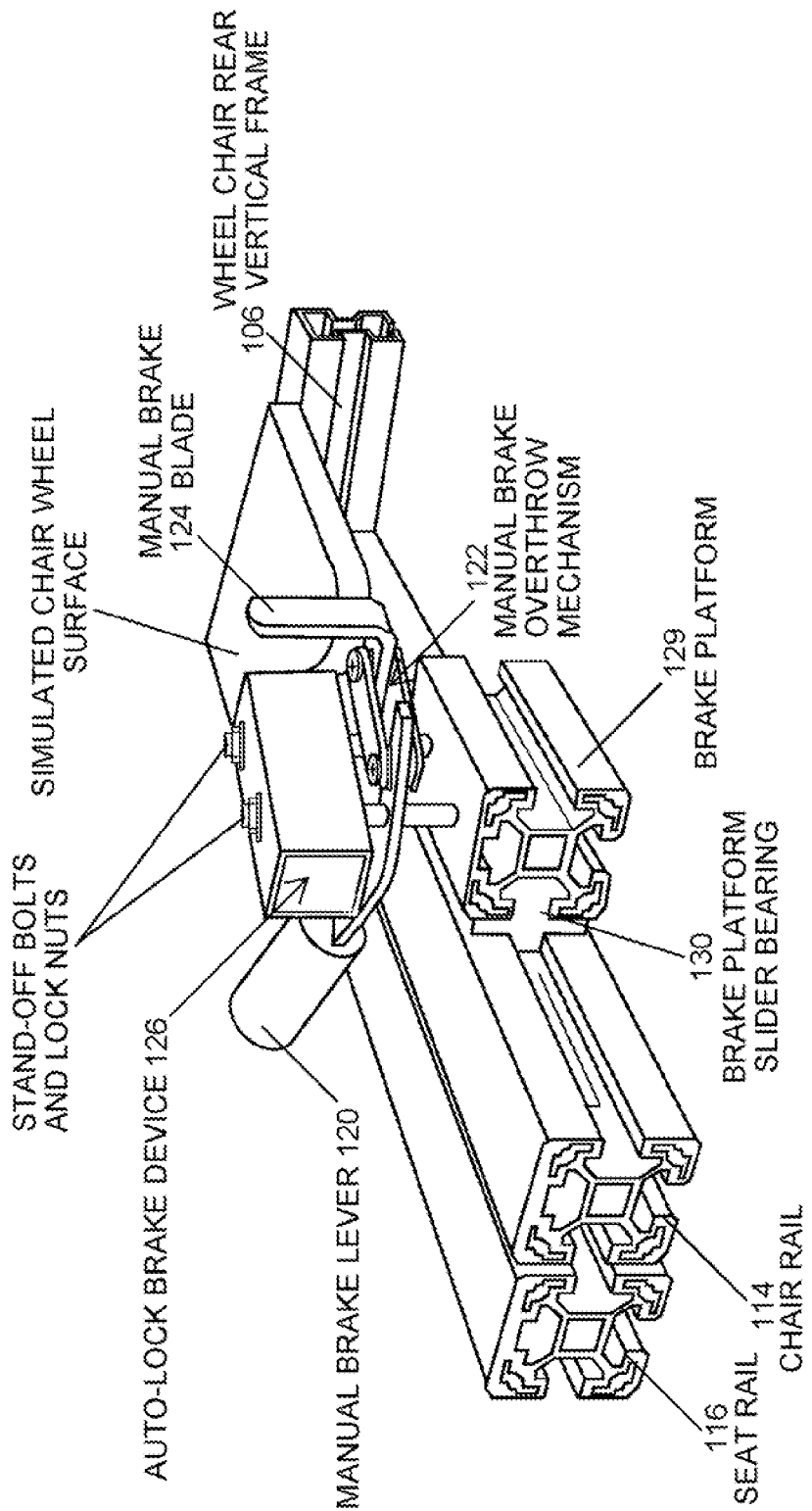
Figure 3:
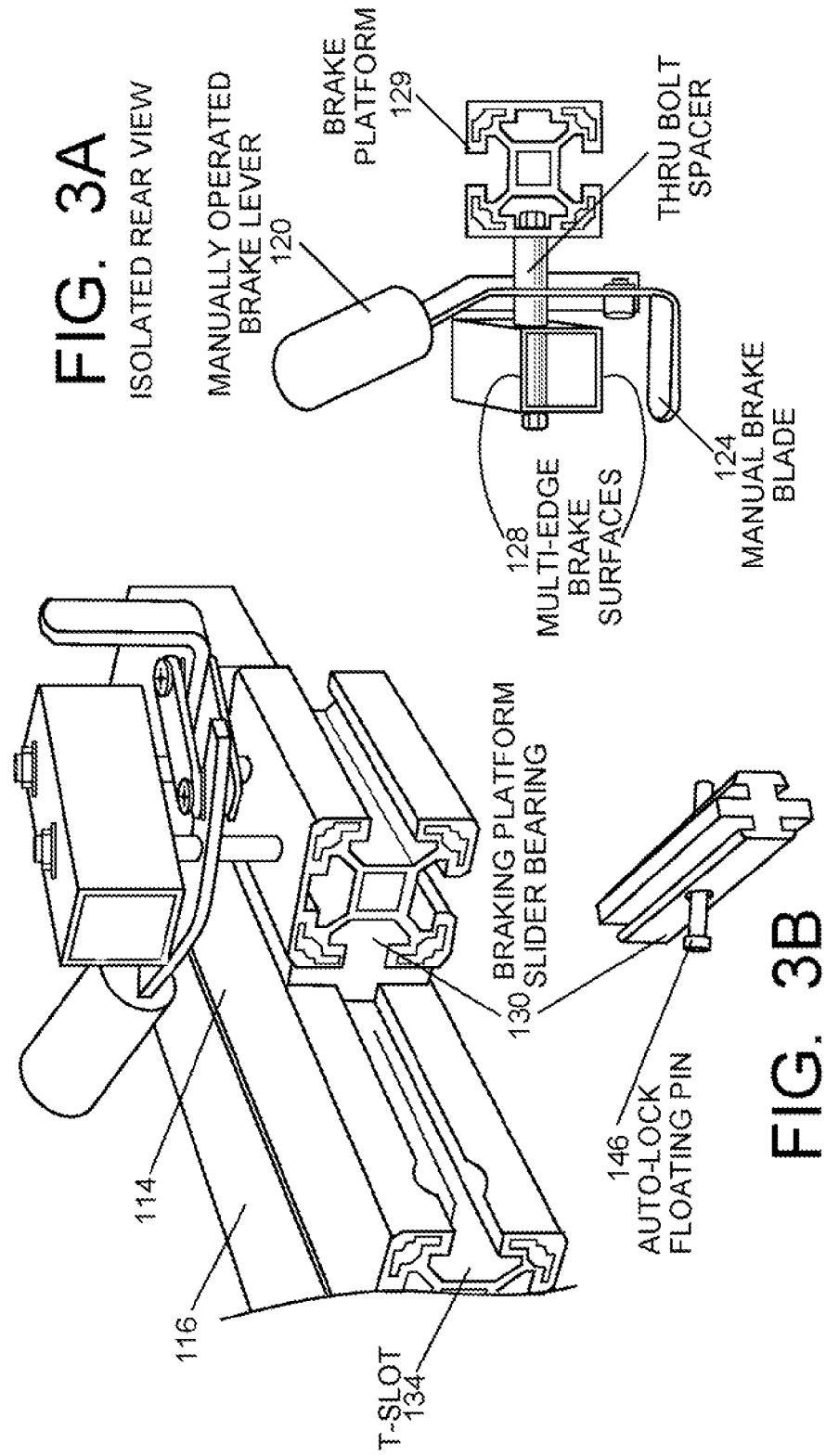
Figure 4:
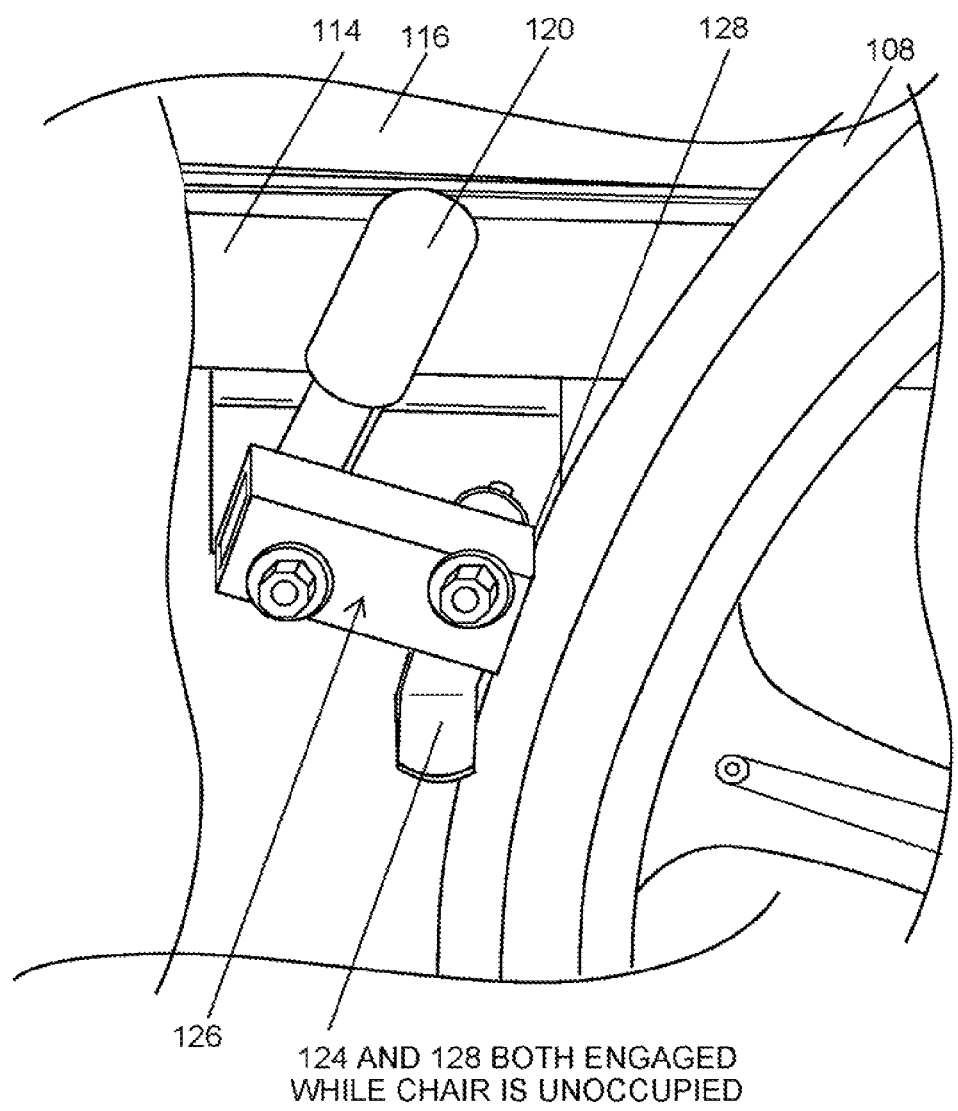
FIGS. 4-7 are fragmentary, schematic illustrations of the operation of parts of an automatic braking assembly for a manually propelled vehicle such as a wheel chair, in accordance with the principles of the present invention.
Figure 5:
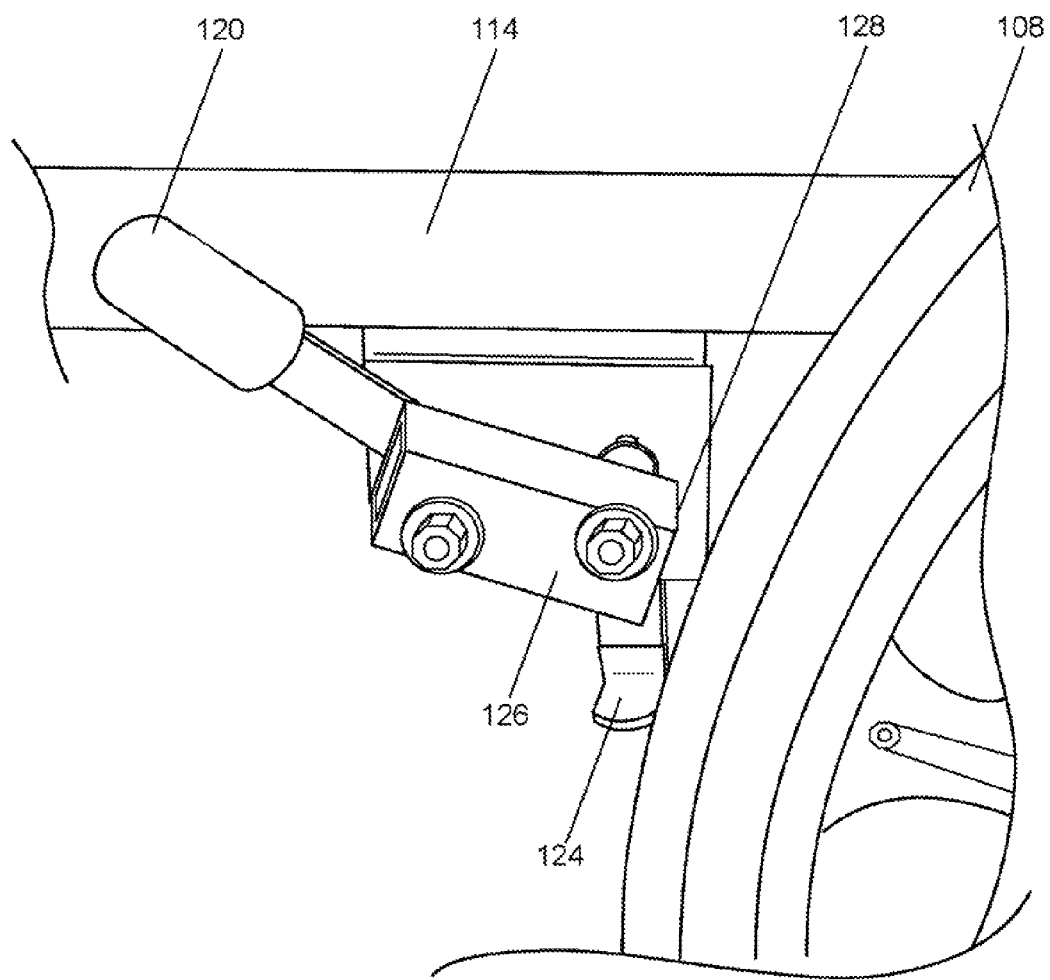

FIGS. 2-22 further illustrate details of one of the automatic braking assemblies 112, according to the principles of the present invention. A manually operated hand brake lever 120 connected with a brake platform 129 operates a manual brake overthrow mechanism 122 that manipulates a brake blade 124 for locking the wheel 108 of the wheel chair. The overthrow mechanism 122 and the brake blade 124 are both of conventional design for a wheel chair. In addition, the manually operated hand lever 120 can be manually manipulated relative to the brake platform 129 to cock an auto lock brake device 126 to an automatic locking armed condition, and also to move the brake blade 124 to an unlocked condition. The auto lock brake device 126 comprises a relatively rigid structure (e.g. metal) with multi edge brake surfaces 128 at an end of the auto lock brake device 126. In the illustrated example, there are two multi edge brake surfaces 128 at the end of the auto lock brake device. When the auto lock brake device 126 is triggered, e.g. by an occupant starting to rise from the seat 118, the multi edge brake surfaces 128 are rapidly forced into contact with the wheel 108 (virtually simultaneously), to lock the wheel against movement. The automatic braking assembly also includes a brake platform slider bearing 130 connected to the brake platform 129, an auto lock floating pin 146, described further below, and a tension spring assembly, also described further below. Also, the chair rails 114 and the seat rail 116 are preferably formed of extruded material such as extruded aluminum, and have cross sectional configurations as shown in FIG. 2, with a T-slot 134 along the bottom of the chair rail 114. The brake platform slider bearing 130 fits into the T-slot 134 and can slide along the bottom of the chair rail 114.

Figure 6:
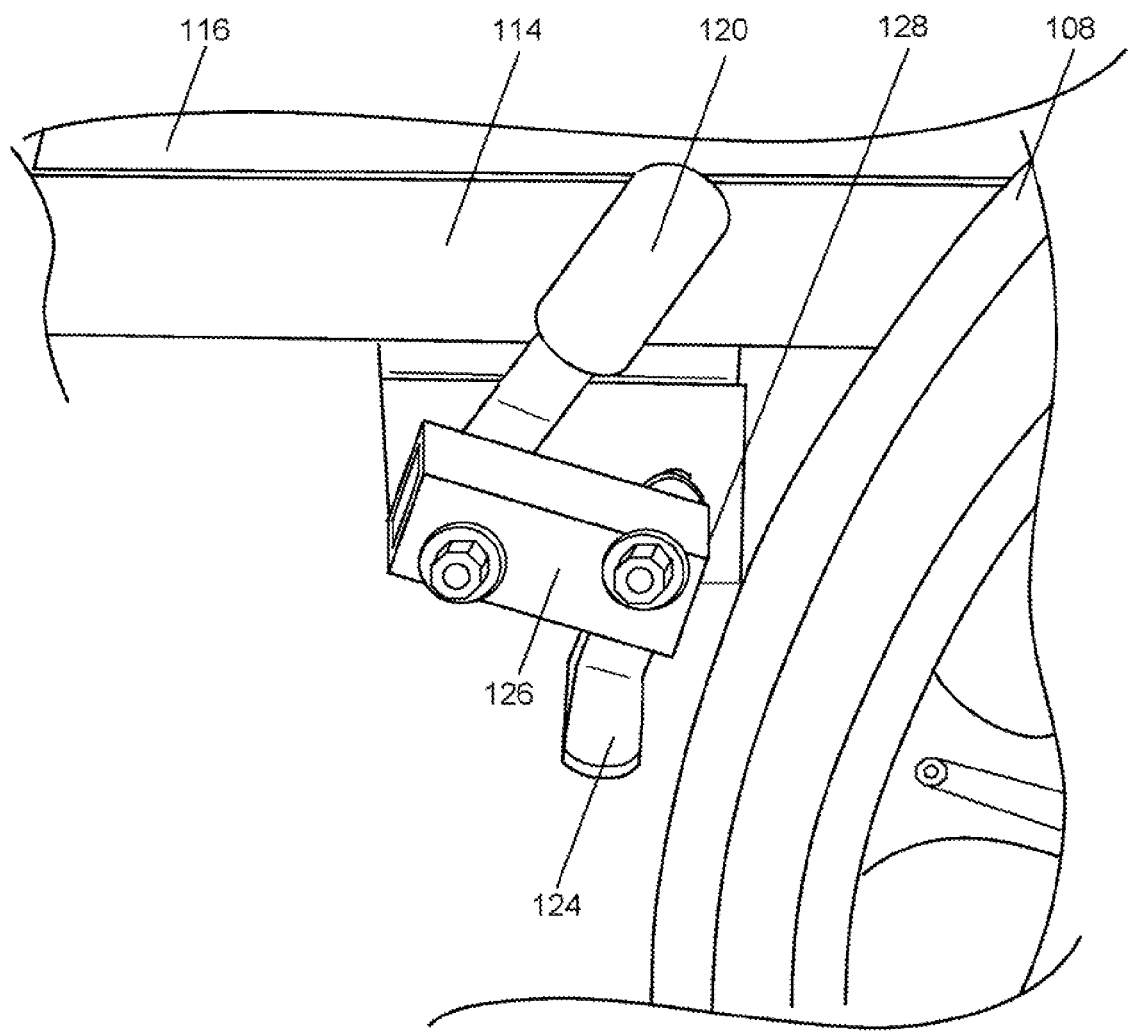
Figure 7:
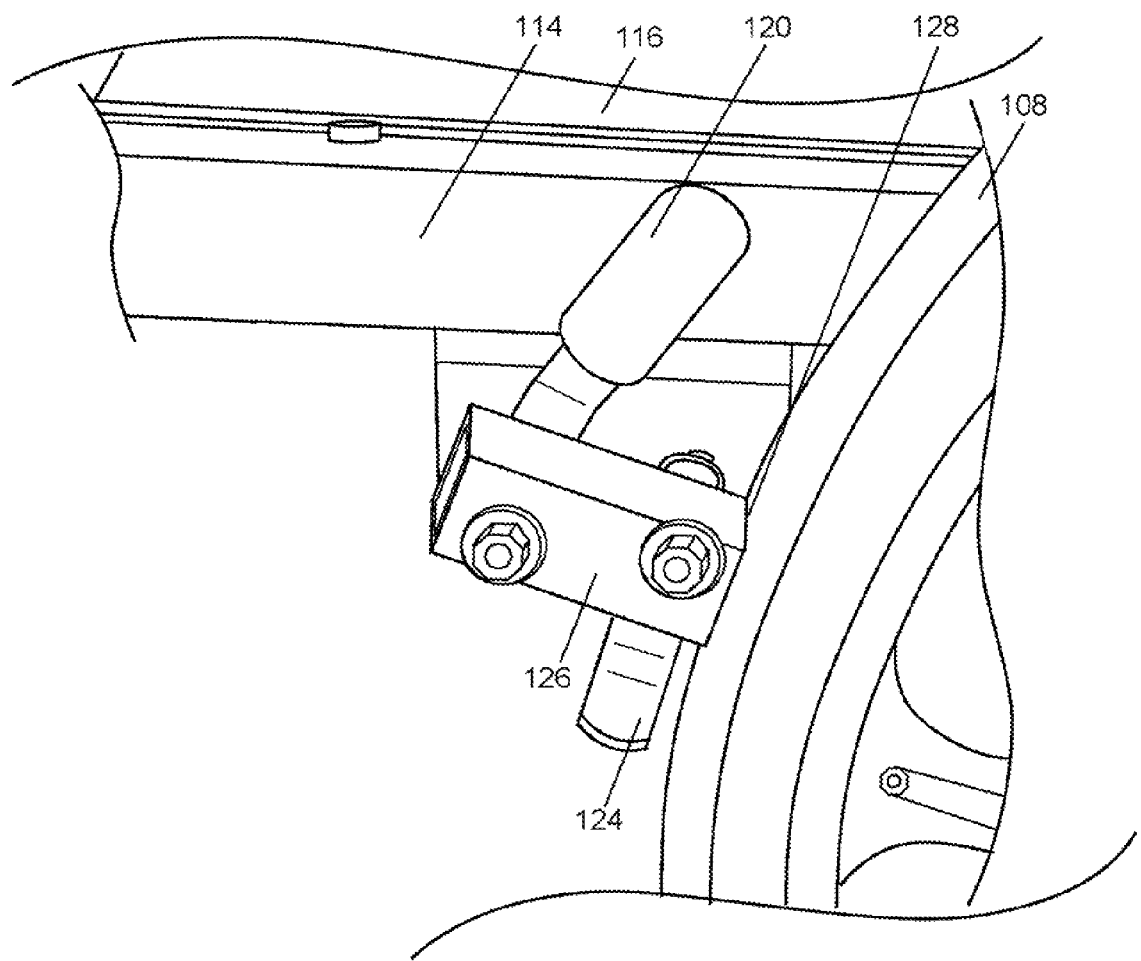

As shown in FIGS. 6 and 7, when the hand lever 120 is manipulated to cock and release the auto lock brake device 126, the automatic braking assembly 112 is in a condition where the auto lock brake device 126 (with its multi edge brake surfaces 128) is spaced from the wheel 108, and the auto lock brake device is cocked and in condition to be forced into locking engagement with the wheel if an occupant starts to rise from the seat 118 of the wheel chair. The hand lever 120 can also be manipulated to unlock the brake blade 124 (preferably as the automatic braking assembly is being cocked); so that the wheel chair is in a more traditional wheel chair state where it can be propelled in a traditional fashion. As shown from the locking sequence of FIGS. 4-7, the automatic locking function is initiated by a wheel chair occupant starting to rise from the wheel chair. As the occupant starts to rise, the chair and seat rails automatically separate (e.g. by pivoting about a fulcrum), and the multi edge brake surfaces 128 on the auto lock brake devices 126 are driven automatically into engagement with respective wheels 108, to securely lock the wheels against movement.

As further illustrated in the Figures, the manual brake lever 120 is connected to the brake platform slider bearing 130, and a tension spring assembly, which forms part of the automatic braking assembly, includes (a) a tension spring 140 that extends between one of a pair of slider bolts 142 that are fixed to the auto lock brake slider bearing 130 and (b) an adjustment plate 144 that is fixed to the chair rail 114 in a selected position. When the manual brake lever 120 is being manipulated to cock (or arm) the automatic braking assembly, the slider bearing 130 is pulled to the left in FIGS. 18-22. The seat rail 116 carries a floating pin 146 that can move vertically within the seat rail 116 unless engaged with the brake platform slider bearing 130 in the manner described below. The floating pin 146 is disengaged from the slider bearing 130 until the slider bearing moves far enough away from the tension spring adjustment plate that the floating pin can fall into a hole 132 in the brake platform slider bearing 130. As the brake platform slider bearing moves away from the tension spring adjustment plate 144, the tension spring 140 is tensioned, and when the floating pin 146 falls into the opening in the slider bearing, the tension in the tension spring 140 is held or maintained, so that the auto lock is now armed or cocked. In that state, whenever an occupant seeks to rise from the chair, a compression lift spring 150 on each side of the wheel chair that has been compressed between the seat rail 116 and the chair rail 114 applies a biasing force to the seat and chair rails that causes the front end of the seat rail to separate (i.e. pivot away) from the chair rail. Thus, releases the floating pin 146 from the brake platform slider bearing 130, resulting in tension spring 140 pulling hard on the brake platform slider bearing 130, and thereby pulling or driving the auto lock brake device 126 with the multi edge brake surfaces 128 into the wheel 108, to lock the wheel against movement.

Figure 10:
FIGS. 10, 11, 11A, 11B and 12 schematically illustrate components of the tension spring assembly, for the automatic braking assembly for a manually propelled vehicle such as a wheel chair according to the present invention.
Figure 11:
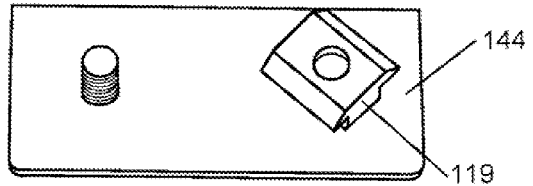
Figure 11A:
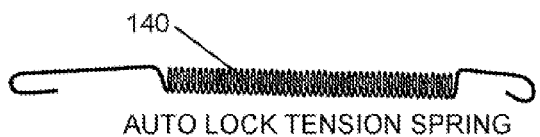
Figure 11B:
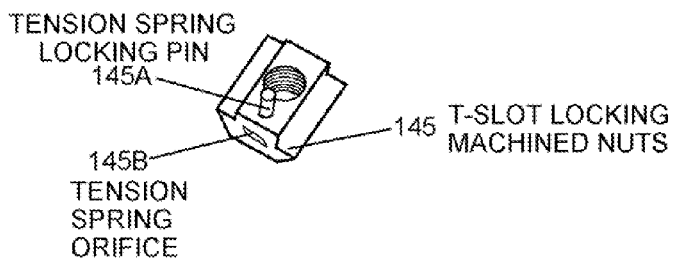
Figure 12:
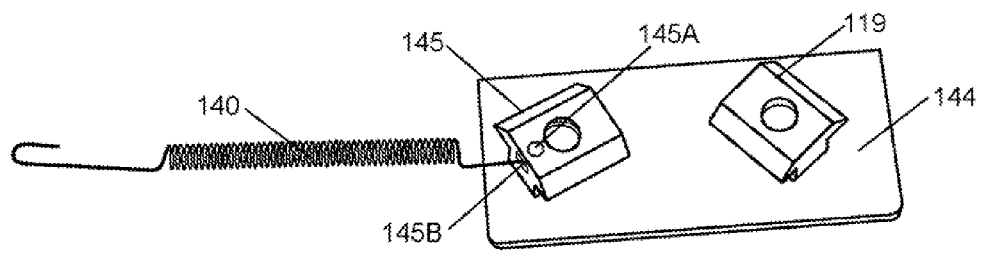
Figure 13:
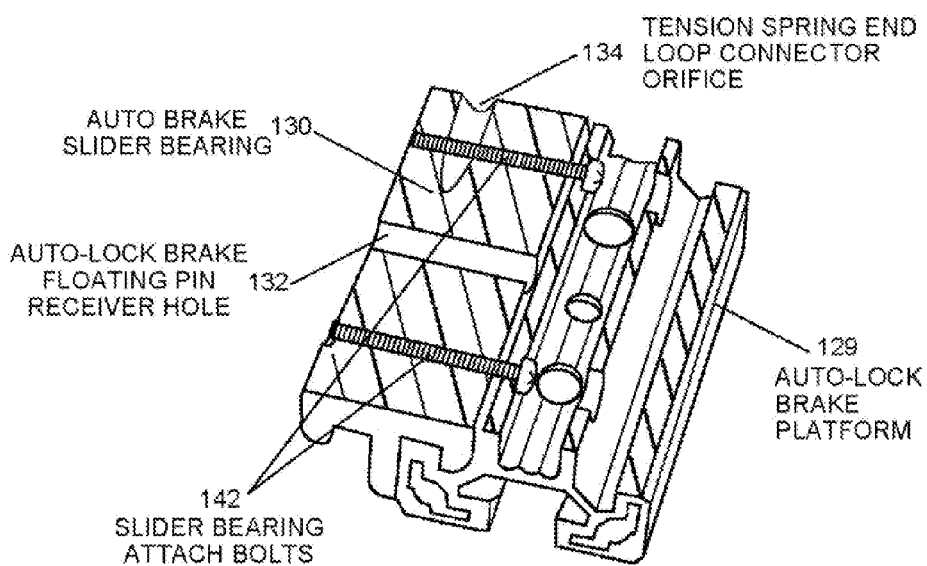
FIG. 13 is a cut away illustration of an aluminum extruded brake platform with slider bearing attached (including attaching bolts), for use with an automatic braking assembly for a manually propelled vehicle such as a wheel chair, according to the principles of the present invention.
Figure 14:
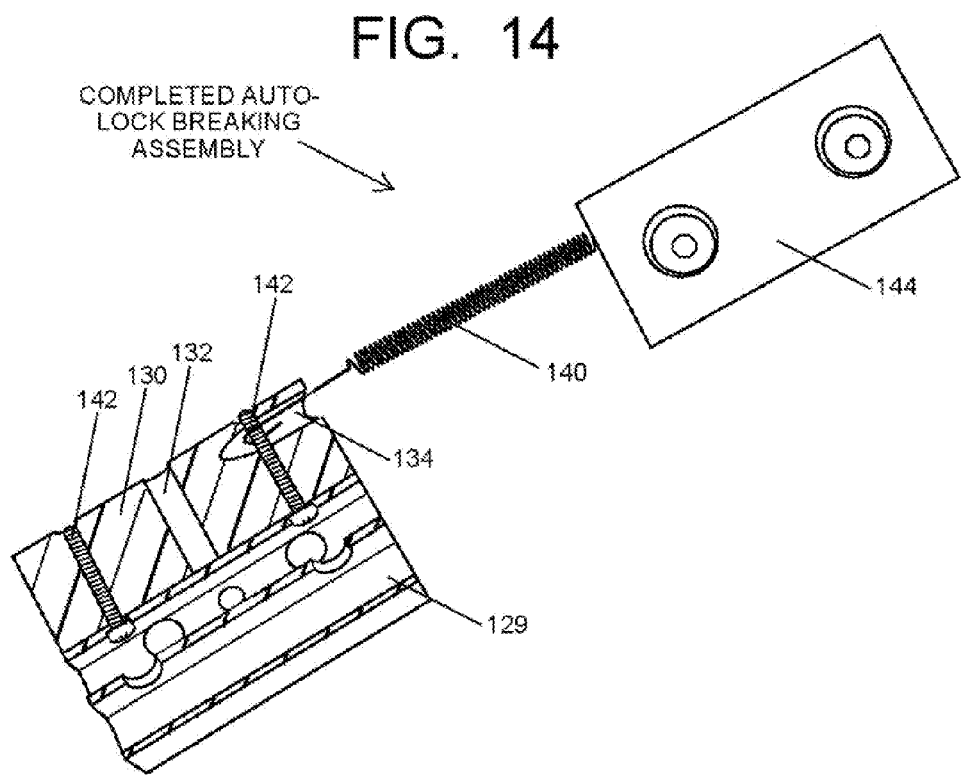
FIG. 14 is a cut away illustration of the brake platform with attached slider bearing attached to tension spring assembly, for use with an automatic braking assembly for a manually propelled vehicle such as a wheel chair, according to the principles of the present invention.
Figure 21:
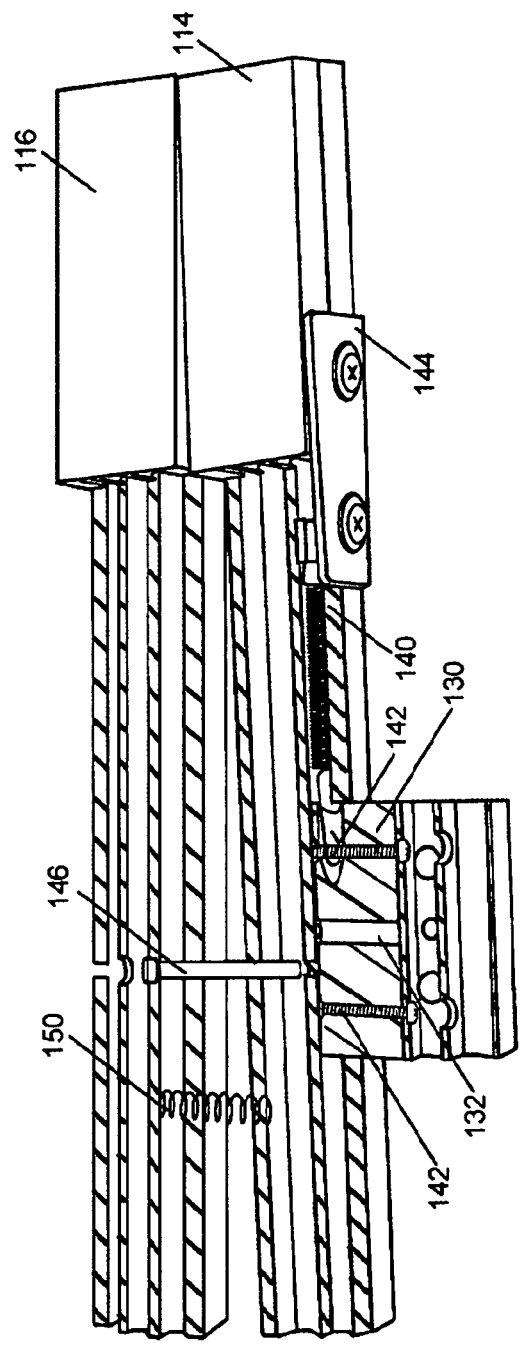
FIG. 21 is a schematic, partially cut away illustration of a portion of an automatic braking assembly for a manually propelled vehicle such as a wheel chair, according to the principles of the present invention, showing the auto lock brake device when an occupant starts to get out of the wheel chair.

The following further features of the wheel chair should also be noted:

a. It should be clear from the foregoing description that the automatic braking assembly 112 on each side of the wheel chair effectively encompasses the various parts and components that are connected with the brake platform 129 (or with an element such as the slider bearing 130 that is fixed to the brake platform).

b. The chair rail 114, brake platform 129, and seat rail 116 are each preferably formed as an extruded aluminum component formed with a configuration known as a 3 T-slotted configuration, which is a well known configuration for an extruded aluminum component.

c. Each of the front and rear vertical frame members 107, 106, each of the base horizontal rail and foot rests 115, and each of a pair of handles 101 at the upper ends of the rear vertical frame members 106, are preferably lightweight members, preferably formed of T-slotted aluminum members, that are connected together by mechanical fasteners, preferably with an internal fastening system described below in connection with FIG. 26A, so that the wheel chair frame is essentially a modular structure, with an aesthetically pleasing external appearance that is relatively free of exposed parts and edges, as also described below. Also, the seat and chair rails 116, 114, that support and form part of the automatic braking assemblies 112, are also preferably T-slotted aluminum members that are (a) connected to each other in a manner that enables them to move relative to each other in a predetermined manner, and (b) assembled with the vehicle frame in a manner that enables them to move relative to each other in the predetermined manner while being supported and guided by the vehicle frame.

d. As shown in FIGS. 10, 11B and 12, the end of the tension spring 140 that connects to the adjustment plate 144 is secured to a specially formed T-slot locking nut 145 that has a locking pin 145A that is configured and oriented to be engaged by one end of the tension spring 140. As shown in FIG. 12, the end of the tension spring extends through an opening (or orifice) 145B in the T-slot locking nut 145, to enable the end of the spring to hook about the locking pin 145A.

e. As shown in FIG. 9, the bottom of the chair rail 114 has one or more tightening tool access holes 147, that enable a tightening tool to tighten various components together (e.g. to tighten a rail to one of the rear vertical rails 106 by the internal fastening system described herein).

f. The brake platform slider bearing 130 has an extension that fits inside a channel in the chair rail, and is formed of a material that can slide along the bottom of the chair rail with minimal wear of the material.

g. The extruded aluminum components that form the chair rail 114 and the seat rail 116 can be pivotally connected to each other, in a manner that is simulated in FIGS. 8 and 9 to illustrate the parts that are hinged together, but which in practice would be located to allow those rails to pivot relative to each other, as part of the auto lock function, in a manner that integrates the hinge into the wheel chair structure. Also, as shown in those figures, the seat rail 116 pivots between a position in which it rests directly on top of the chair rail 114 (and compresses the compression lift spring 150,) to a position in which its front end is raised above the chair rail (by the compression lift spring) when the occupant begins to rise from the wheel chair, to enable the multi edge brake surfaces 128 on the auto lock brake device 126 to automatically engage the wheels and lock the wheel chair against movement.

h. Structural components such as the vertical rear frame 106 and some of the rails, can be assembled together by conventional fasteners, e.g. screws, nuts and bolts, thereby eliminating the need to weld the components, and by the internal fastening system described herein, in a way that makes the chair structure convenient and efficient to assemble, without requiring a skilled welder. Also, with the foregoing structure, structural components such as seat rails and chair rails may be able to be retrofitted to at least some existing wheel chairs, so that the benefits of the auto locking device of the present invention can be retrofit to those wheel chairs.

i. The multi edge brake surfaces 128 that form part of the auto lock brake device 126 are designed to be particularly strong and secure in locking the wheel chair against movement when the occupant starts to rise from the wheel chair. Specifically, when the auto lock brake device 126 is pulled or triggered, the multi edge brake surfaces 128 are forced substantially simultaneously into engagement with spaced apart portions of the vehicle wheel(s) 108, and this provides a particularly secure lock on the wheel(s) of the wheel chair.

j. In operation, once the automatic braking assembly has been triggered to lock the wheels 108, it remains locked until it is released by the handle mechanism. Thus, when an occupant is being seated in the wheel chair, the wheels remain locked. Once an occupant is seated, and wants to propel the chair, the handle 120 is rotated in a manner that pulls the brake platform slider bearing 130 in a direction that tensions the tension spring 140, and the slider bearing 130 can continue to move and tension the tension spring until the floating pin 146 falls into the slot 132 in the brake platform slider bearing 130. In that condition, the automatic locking assembly is cocked or armed. However, the wheel chair is still manually locked, until the handle 120 is pulled backward to pull the auto lock brake device 126 with the multi edge brake surfaces 128 away from engagement with the wheel (that action also pulls the traditional manual locking blade 124 away from the wheel), so that the wheel chair can be propelled in a normal way. When the occupant starts to rise from the chair, the seat rail 116 is pivoted by the compression lift spring 150, releasing the locking pin 146 from the slider bearing 130, and allowing the tension spring 140 to propel the auto lock brake device 126 with the multi edge brake surfaces 128 into secure engagement with the wheel.

k. The foregoing components are configured to enable the amount by which the seat rail rises above the chair rail to trigger the auto lock to be selectively set. Currently, it is preferred that they are set such that when the front end of the seat rail rises approximately ⅛ inch from the chair rail, the auto lock will be triggered.

FIGS. 22A, 22B, 23-26 show the application of the principles of the present invention to a folding wheel chair 200. The folding wheel chair 200 includes a seat 218 connected to a seat rail (e.g. via T-slot locking machined nuts 219 similar to those disclosed in connection with FIG. 1. The wheel chair 200 has a rear vertical frame 206 that is similar to the rear vertical frame 106 of FIG. 1, a pair of handles 201 at the top of the rear vertical frame 206, a pair of front vertical frames 207, front and rear sets of wheels 210, 208, respectively (The rear, or main, wheels 208 have axle bearing supports 270 that support the wheels from the chair frame). Also, the wheel chair 200 has base horizontal rail and foot rests 215, handles 201, and a conventional brake blade 224 that are similar to the chair of the previous embodiment. In addition, the chair 200 also has arm rests comprising horizontal rails 266 and padding 268 similar to the arm rests of a conventional wheel chair.

In accordance with the principles of the present invention, the wheel chair 200 includes a seat rail 216 and a chair rail 214 that are biased to separate by pivoting relative to each other about pivot formed by a hinge pin and fulcrum 260 located at the front end of the seat and chair rails and extending between those rails. The seat and chair rails are biased to separate by a torsion lift spring 250 that is secured to the inside of one of the T-slots of the T-slotted (preferably aluminum) member forming the chair rail 214 (e.g. by a lock bolt plate 219 and lock bolt 301) and acts against the inside of one of the T-slots of T-slotted (preferably aluminum) member forming the seat rail 216 (see e.g. FIGS. 23-25).

A latch 256 is pivotally connected to each chair rail 214, and can be manually pivoted from an unlatched condition (FIGS. 23, 24) to a latched condition (FIG. 25) in which it engages (hooks about) a latching pin 252 on the associated seat rail 216. In the latched condition, the seat and chair rails are prevented from separating under the bias of the torsion lift spring 250. When the latch is pivoted to the unlatched condition, the seat and chair rails can pivot automatically under the bias of lift spring 250 to a condition in which the automatic braking assembly will automatically lock the wheels 208 against movement.

An automatic braking assembly 212 that is generally configured and operates in a manner similar to the automated braking assembly of FIG. 1. The automatic braking assembly 212 is supported by the seat and chair rails, associated with each of the rear wheels 208, and is automatically actuated to lock a respective rear wheel when the seat and chair rails separate under the bias of the torsion lift spring 250. The automatic braking assembly 212 is secured to a stabilizer plate 264 that is attached to the chair rail 214 by a series of attach-thru bolts. The automatic braking assembly 212 includes a tension spring 240 that is connected with an adjustment plate 244 of the automatic braking assembly 212 in the manner described and shown in connection with the chair of the previous embodiment of FIG. 1. When the automatic braking assembly 212 is cocked, to disengage a multi edge brake (similar to the multi-edge brake 126) from the wheel 208, the tension spring 240 is held in an extended state (by the same structure, and in the same manner, as in the previous embodiment). When the seat and chair rails separate, e.g. under the bias of lift spring 250 when an occupant starts to get out of the chair, the tension spring 240 is released, and forces the multi edge brake into locking engagement with a respective one of the wheels 208 to securely lock the wheel against movements.

The chair rail 214 also supports a folding scissor attachment bracket 262 that enables a pair of folding scissors to be attached to the wheel chair. As shown in FIG. 22B, the folding scissors have a configuration similar to the folding scissors of a conventional folding wheel chair, and include a pair of scissor cross laterals 274 (that also attach to supports along the bottom rail 215 that are similar to bracket 262), and a scissors pivot bolt 286, that enables the cross laterals to pivot about that bolt as the chair is being folded. Also, there is a folding spanner bar 282 at the rear of the chair, that comprises a pair of bar sections that can pivot about folding hinges 292 (one of which is midway along the bar 282 and the others are attached to the rear verticals 206) to enable the chair to be folded. When the chair is opened the spanner bar will open, and stabilize the chair in the open condition, until and unless an upward force is applied to the bottom of the middle one of the hinges 292 to initiate pivoting of the bar sections 282.

Figure 22A:
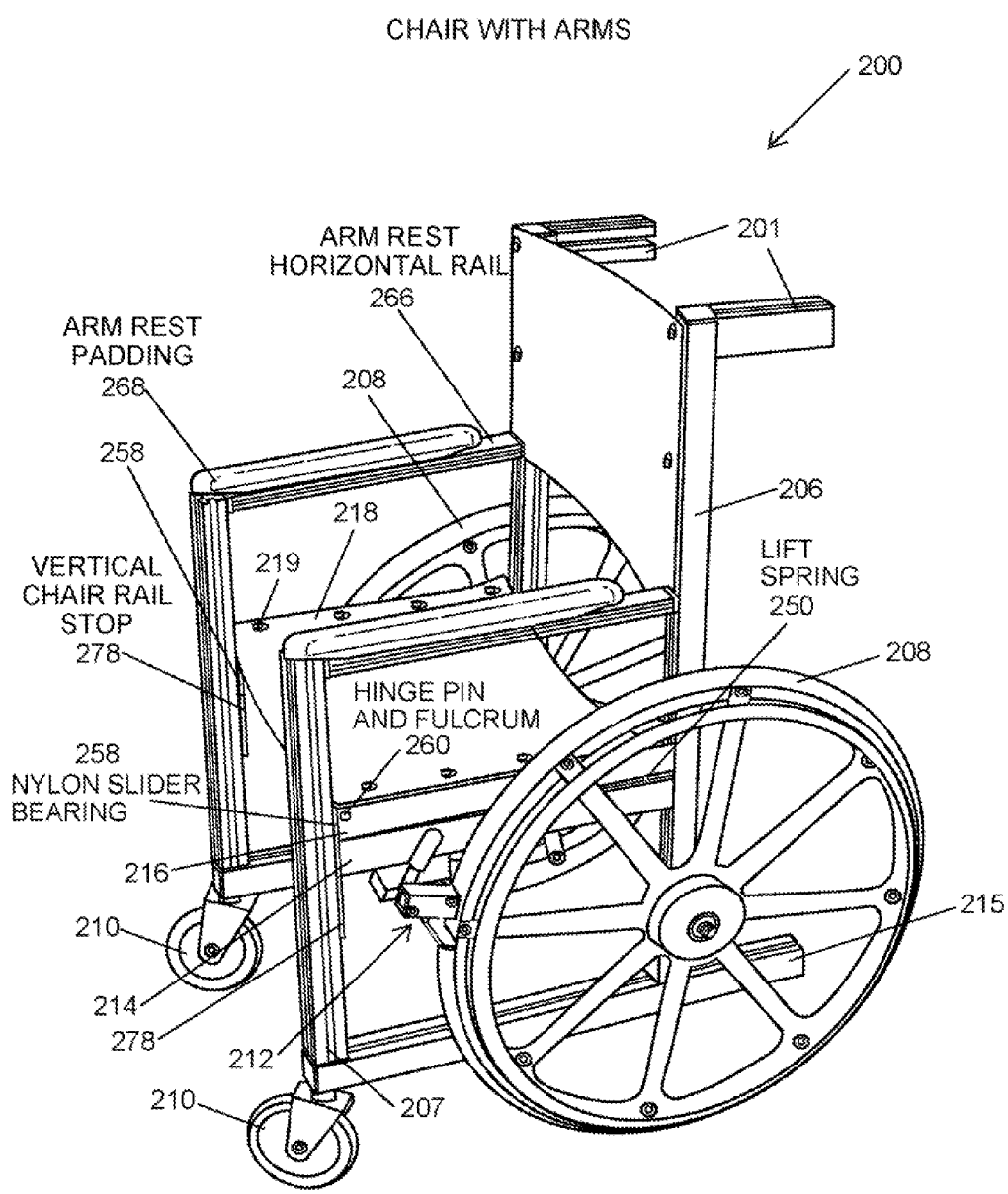
FIG. 22A is a schematic illustration of another version of a manually propelled vehicle such as a foldable wheel chair, with an automatic braking assembly that is configured according to the principles of the present invention, and has chair and seat rails that separate at a different location than the seat and chair rails in the wheel chair of FIG. 1.
Figure 22B:
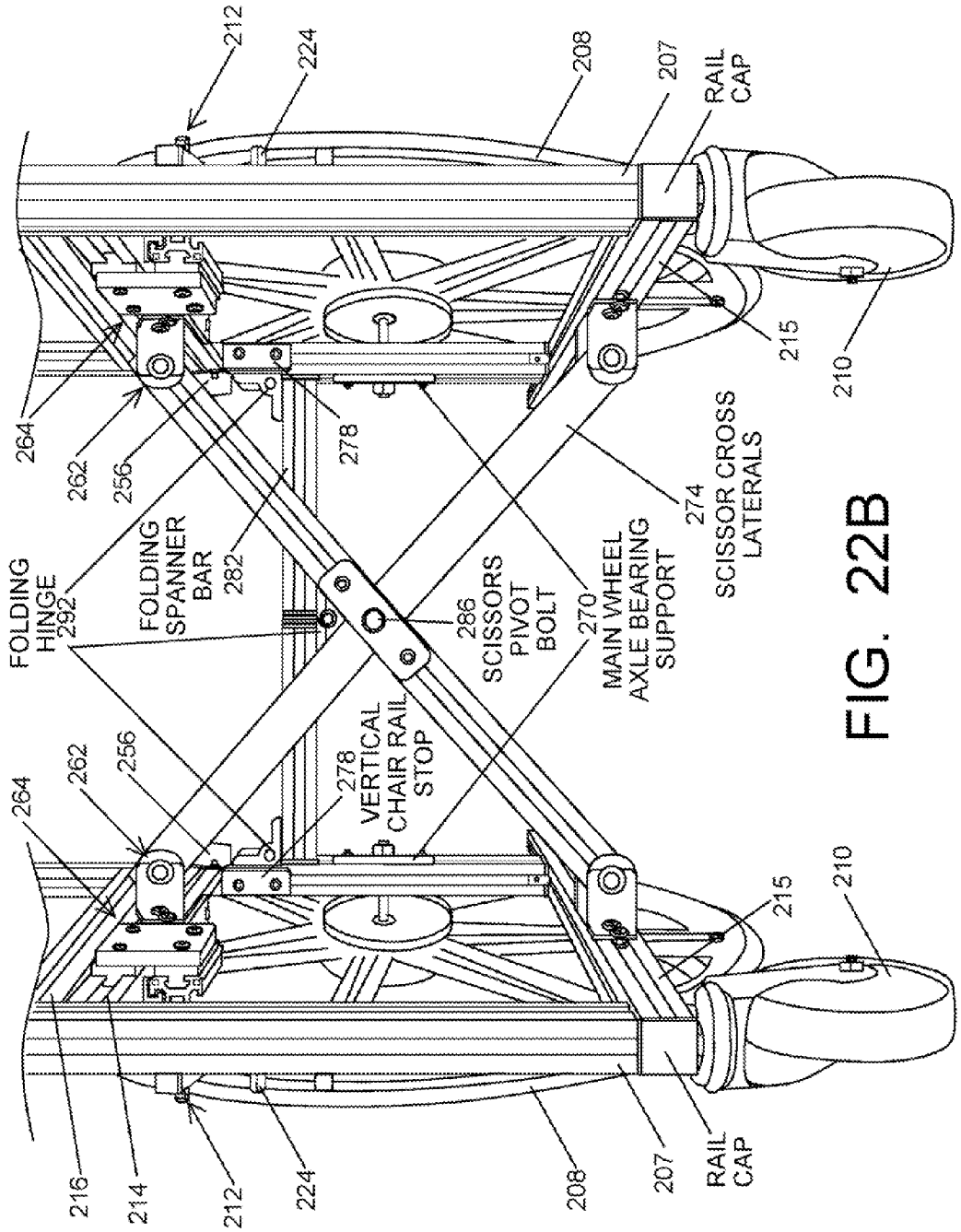
FIG. 22B is a front view of a portion of the foldable wheel chair of FIG. 22A.
Figure 23:
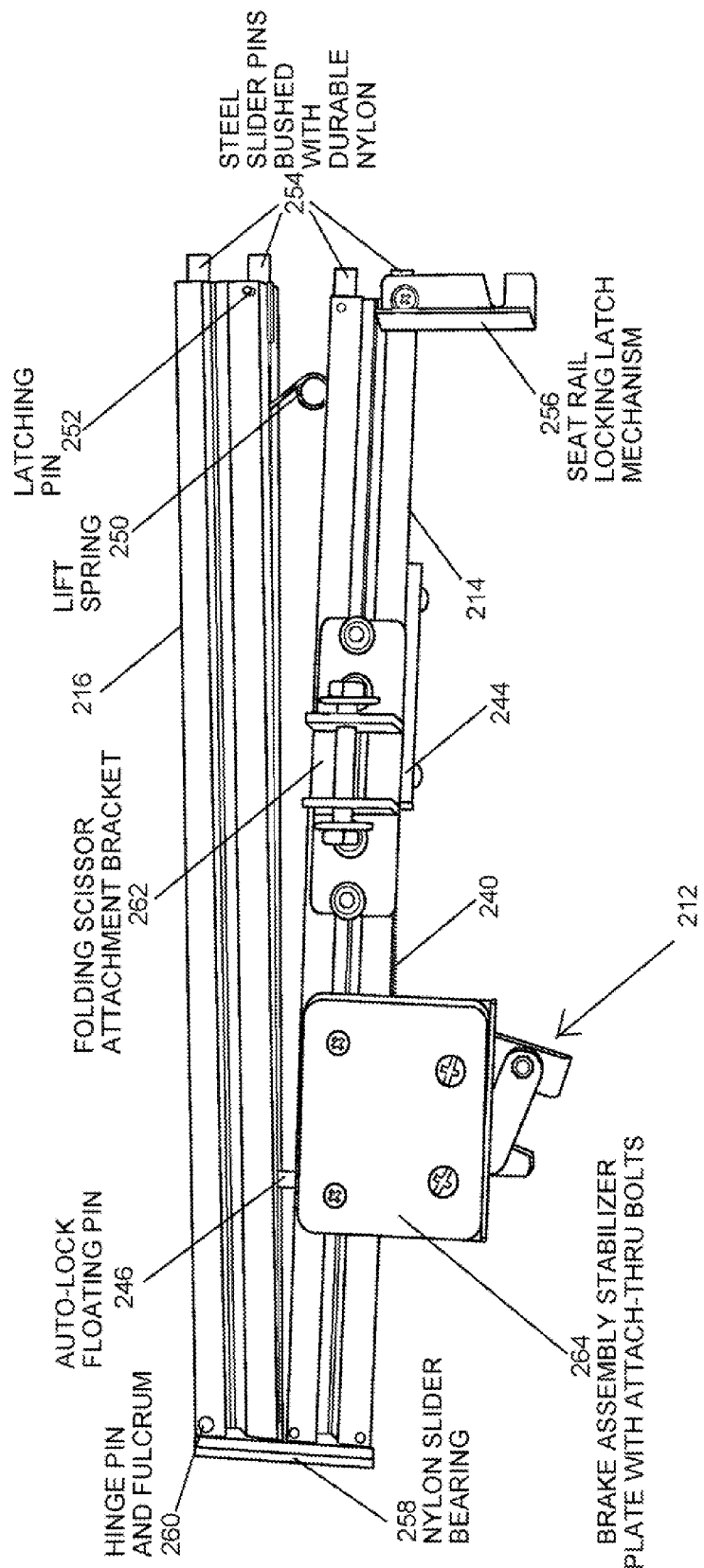
FIG. 23 is a side view of the seat and chair rails of the wheel chair of FIG. 22A, taken from the inside of the chair (the side adjacent the vehicle occupant), and showing some of the components connected with the seat and chair rails, in accordance with the principles of the present invention.
Figure 24:
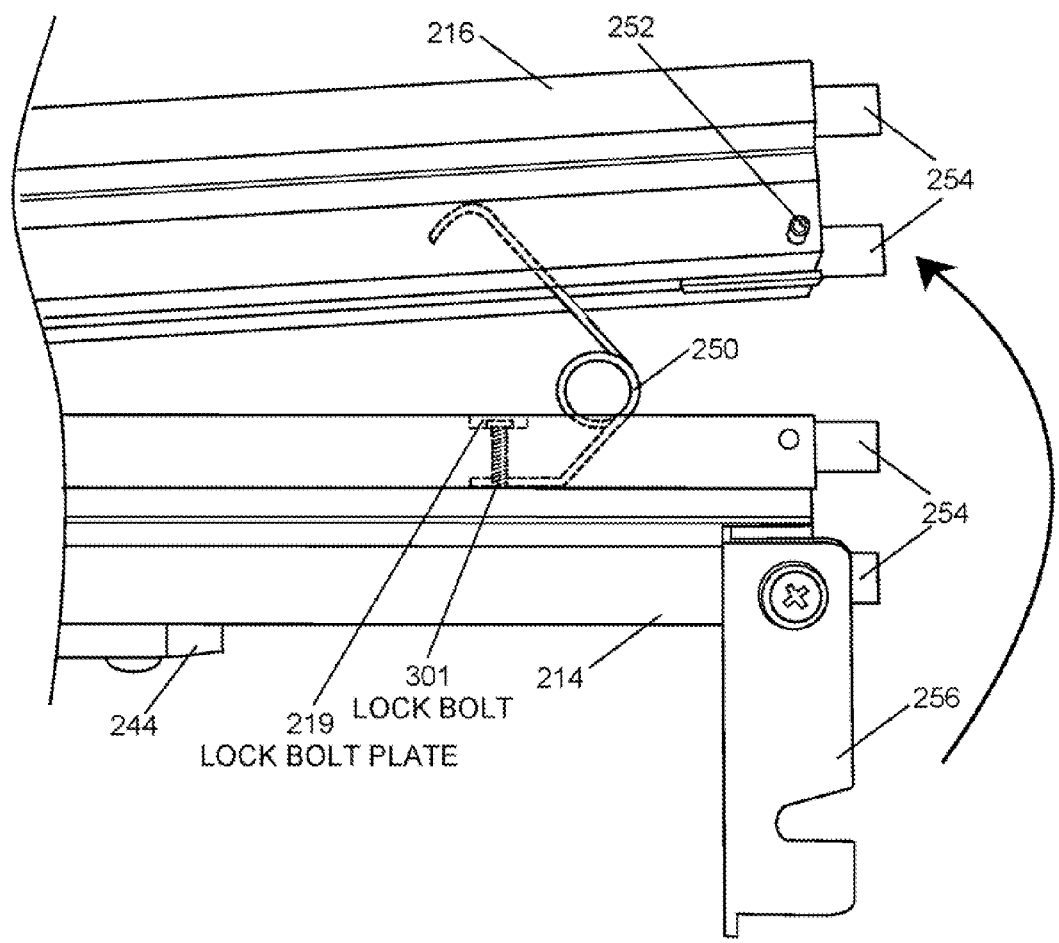
FIG. 24 is a fragmentary, enlarged view of the seat and chair rails of FIG. 23, as the seat rails are separating to initiate operation of the automatic braking assembly, in accordance with the principles of the present invention.
Figure 25:
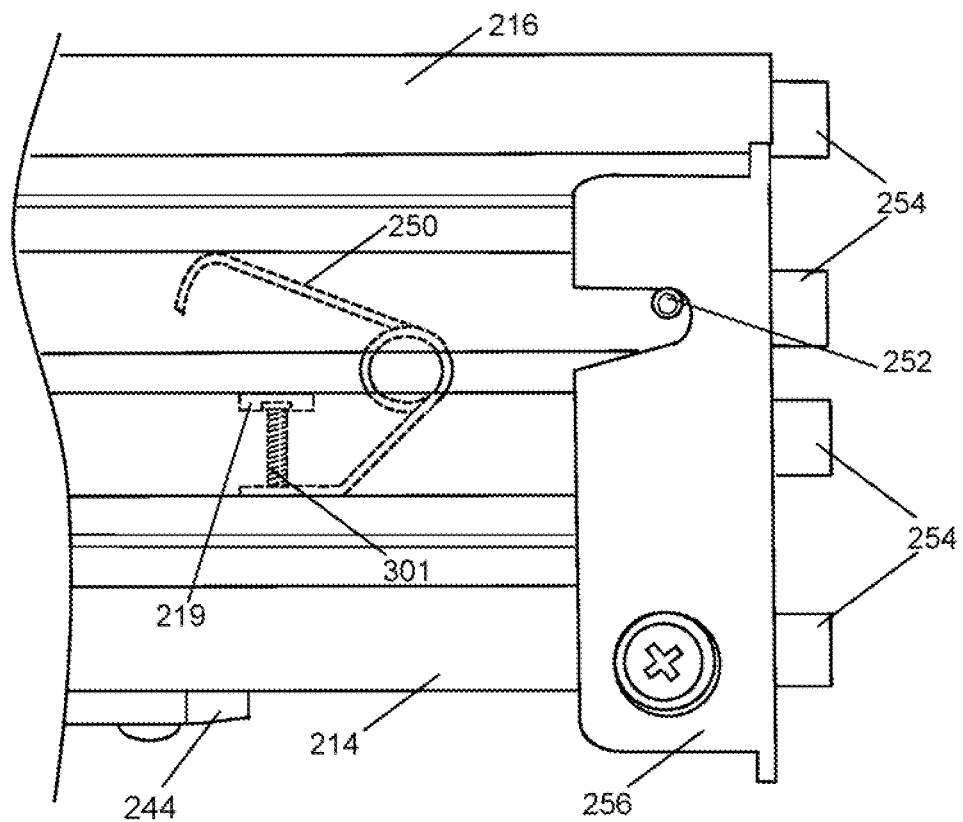
FIG. 25 is a fragmentary, enlarged view of the seat and chair rails of FIG. 24, with the seat and chair rails in a latched condition, as the chair is being folded or opened, in accordance with the principles of the present invention.

The chair of FIG. 22A is thus generally similar to the chair of FIG. 1, in the manner in which it is automatically locked against movement when an occupant starts to rise from a seated position on the chair. However, it should be noted that one important difference is that in the chair of FIG. 22A, the seat and chair rails have a pivot point or fulcrum at the front of the chair, and applicants currently prefer that location for the fulcrum.

Also, the chair of FIG. 22A is also different from the chair of FIG. 1, in that the chair of FIG. 22A has a seat rail latch mechanism 256 at the rear of the seat and chair rails. Also, the rear of the seat and chair rails have steel slider pins bushed with durable nylon 254 that fit into T-slots in the rear vertical 206 of the chair, nylon slider bearings 258 at the front ends of the seat and chair rails that fit into T-slots in the front vertical frame members 207. Also, the rear verticals 206 of the chair have vertical chair stop rails 278. In addition, the chair of FIG. 22A has arm rests formed by arm rest horizontal rails 266 that are connected to the rear and front vertical frame members 206, 207, and arm rest padding 268 on the rails 266.

In the operation of the wheel chair of FIG. 22A, the seat and chair rails are continuously biased by lift spring 250 to separate by pivoting about their fulcrum formed by hinge pin 260. The nylon bushed steel slider pins 254 enable the seat and chair rails to separate at the rear of the chair (by pivoting or fulcruming about the pivot or fulcrum 260 at their front ends). The nylon bushed steel slider pins 254 and the nylon slider bearings 258 remain assembled with, and therefore supported and guided by the front and rear vertical frames. Specifically, the hinge pin 260 couples the seat and chair rails at their front ends, and enables them to pivot relative to each other (either under or against the bias of the lift spring 250). As the seat and chair rails pivot and/or slide upward or downward along the vertical frame members 206, 207, the nylon slider bearing 258 slides in T-slot in the front vertical frame member 207, and the nylon bushed slider pins 254 can slide and tilt in the T-slot in the rear vertical frame member 206. Thus, the seat and chair rails are always supported and guided by the front and rear vertical frame members 207, 206. When a vehicle occupant is out of the chair, and it is desired to maneuver the chair in a traditional fashion (e.g. roll the chair, fold up the chair, etc.) the seat and chair rails are initially manipulated (manually) to press them together against the bias of spring 250. When the seat and chair rails are pressed together, the latch 256 can be pivoted to a latched condition to maintain the seat and chair rails together. The automatic braking assembly can then be cocked to a condition where the auto lock brake device is released from locking engagement with a wheel 208 of the wheelchair. The wheel chair is then in a state in which it can be maneuvered as a traditional wheel chair, i.e. it can be wheeled along without the vehicle occupant, folded up, etc. When the wheel chair is being folded up, applying upward pressure at the middle hinge 292 of the folding spanning bar 282 will begin to fold that bar about the middle hinge 292, which in turn will enable the folding scissors to pivot in a manner what enables the chair to be folded up. To open the wheel chair, the chair is manipulated to cause the folding scissors to open the wheel chair and as it is fully opened, the folding spanner bar 282 will effectively snap open to a condition in which it stabilizes the wheel chair in an open condition (if the latched seat and chair rails had been pulled up as the chair was being folded, they can be pressed downward toward the vertical chair rail stop 278 as the chair is being opened). Once the chair is opened, and the spanning bar is in a stabilizing condition, the latch 256 can be pivoted to the unlatched condition, which will cause the automatic braking assembly to automatically engage the wheels 208 and hold the wheel chair in a locked condition (requiring the automatic braking assembly to be cocked when an occupant is seated in the wheel chair, to place the wheel chair in a normal wheel chair operating mode).

As will also be appreciated from the wheel chair constructions described and illustrated above, the wheelchair is constructed as a modular structure, with an internal fastening system, as can be particularly appreciated from FIG. 26. More specifically, as schematically shown by FIGS. 26 and 26A, fastening between frame components is internal to those members (i.e. it is not visible to a person viewing the chair from the outside). For example, the fastening between the handles and the rear vertical 206 is by one or more screws 299 that are internal to the frame 206 and the handle (In FIG. 26A, a screw 299 is shown prior to being inserted into a tool access hole 302 in a rear vertical 206, and is also shown (in dashed lines) located internal to those members when it is tightened to fasten the members together. A tightening tool can access the screws through one or more tightening tool access holes 302 (similar to the holes 147 shown in FIGS. 8 and 9). Similar internal fasteners can be used at other fastening points, e.g. between the bottom of the rear verticals 206 and the base horizontal rails and foot rests 215, between the horizontal arm rest rails 266 and the rear and front verticals 206, 207, and between the base horizontal rails and foot rests 215 and the front wheels 210.

The foregoing internal fastening system, along with the fact that many of the components of the automatic braking assembly (e.g. tension springs, lock floating pins, slider bolts, adjustment plates, etc) are primarily located within the various rails, are substantially unobtrusive, enables the wheel chair frame to have an aesthetically pleasing appearance, minimizes the likelihood of occupant exposure to external portions of such components, while enabling those components to be accessible (e.g. via tool tightening holes similar to 147), and also provides the wheel chair with structural integrity comparable to a wheel chair of welded components Also, the foregoing features allows an entire wheel chair to be assembled at a remote side.

It should also be noted that the automatic braking assembly, including the chair rail and seat rail that form part of the automatic braking assembly, can be retrofitted onto an existing wheelchair, e.g. to add an automatic braking assembly to an existing wheelchair. Moreover, the modular wheelchair construction described above enables frame components that become damaged or worn, to be replaced, rather than having to effectively replace an entire wheelchair.

While the foregoing description relates to currently preferred embodiments of a wheelchair configured according to the principles of the present invention, applicants believe there may be ways to configure the wheelchair such that it conforms even more closely to the way wheelchairs are currently constructed and operated, while still conforming to the principles described in this application. Specifically, applicants envision a spring loaded brake platform with lateral motion provided by a blade from the seat rail that penetrates the chair rail in angular manner, pushing brake platform away from the wheelchair wheel. When the seat is elevated with compression springs on exodus by the occupant, the brake platform is released, allowing impact of the multi edge brake surface with the wheel. This would remain locked until the manual locking lever is advanced while the patient is seated, again arming another compression spring that would be released again when the occupant arises. Similar to the preferred embodiment, the wheelchair is locked in its default mode, and only unlocked when intentionally done.

Accordingly, the foregoing description provides a manually propelled vehicle such as a wheel chair with a locking mechanism that is automatically triggered whenever an occupant starts to rise from a seated position on the wheel chair, and also provides several new and useful structural, operation and design concepts for a vehicle such as a wheel chair. With the foregoing disclosure in mind, it is believed that various adaptations of a manually propelled vehicle, according to the principles of the present invention, will be apparent to those in the art.

The invention claimed is:

1. A manually propelled vehicle such as a wheel chair that is configured to be selectively placed in an automatic lock condition in which (i) the vehicle can move in a conventional manner while an occupant is seated in the vehicle, and (ii) the vehicle is automatically locked against movement when an occupant begins to rise from a seated position on the vehicle, wherein the vehicle has an automatic braking assembly that has a cocked position in which an auto lock brake device is disengaged from the wheel of the vehicle, and is automatically moved to a locked condition in which it locks the vehicle against movement when an occupant begins to rise from a seated position on the vehicle, wherein the vehicle includes a seat rail disposed over a chair rail, the seat rail resting on the chair rail when an occupant is seated in the vehicle and the automatic braking assembly is in the cocked position, and the seat rail being automatically pivoted relative to the chair rail when an occupant begins to rise from a seated position and when the seat rail pivots relative to the chair rail the auto lock brake device is automatically moved to the locked condition.

2. The vehicle of claim 1, wherein the automatic braking assembly includes a tension spring that is being held in tension that is released and causes the auto lock brake device to lock the vehicle against movement when an occupant begins to rise from the vehicle, and wherein the automatic braking assembly is configured to be manipulated to establish and hold the tension spring in tension while the seat rail is resting on the chair Tail, and tension in the tension spring is released when the occupant begins to rise from the vehicle and the seat rail is automatically pivoted relative to the chair rail.

3. The vehicle of claim 2, wherein the vehicle comprises a wheel chair, the seat and chair rails are continuously biased to separate at a predetermined location and can be compressed toward each other against the bias to a compressed condition, a latch is provided that can be selectively moved to a latching position in which it latches the seat and chair rails in a compressed condition, wherein the automatic braking assembly can be manipulated to a released condition in which the wheel is not locked when the seat and chair rails are latched in the compressed condition, wherein the wheelchair is configured to be manipulated in a traditional fashion when the seat and chair rails are latched in the compressed condition, and wherein the latch can be released from the latching position when it is desired to place the automatic braking assembly in an operating condition, whereby separation of the seat and chair rails under the bias causes the automatic braking assembly to engage the wheel and lock the wheelchair against movement.

4. The vehicle of claim 3, wherein the chair rail and the seat rail are each formed of relatively rigid members that can be assembled without welding.

5. The vehicle of claim 4, wherein the relatively rigid members that form the chair rail and the seat rail are comprised of extruded aluminum members.

6. A manually propelled vehicle such as a wheel chair that is configured to be selectively placed in an automatic lock condition in which (i) the vehicle can move in a conventional manner while an occupant is seated in the vehicle, and (ii) the vehicle is automatically locked against movement when an occupant begins to rise from a seated position on the vehicle, wherein an auto lock brake device can be brought into contact with a wheel of the vehicle to lock the wheel movement, wherein the manually propelled vehicle comprises a plurality of frame components that are connected to each other by mechanical fasteners in a configuration that forms a Wheelchair frame, at least some of the frame components being connected to each other by an internal fastening system that includes one or more mechanical fasteners connecting the frame components while being substantially internally located in the frame components, further including chair and seat rails that are connected to each other and assembled with the frame in a manner that enables the chair and seat rails to pivot relative to each other while assembled with the frame.

7. The manually propelled vehicle of claim 6, wherein the chair and seat rails support the auto brake device.

* * * * *